United States Patent [19]

Chang et al.

[11] Patent Number: 5,010,544

[45] Date of Patent: Apr. 23, 1991

[54] FAULT LOCATION OPERATING SYSTEM WITH LOOPBACK

[75] Inventors: Ker-Chin Chang, San Jose; Clarence E. Elkins, Pleasant Hill; Paul A. Marshall, Morgan Hill; Duane E. Dunwoodie, Los Altos; Mohamed M. Mansour, Sunnyvale; Paul R. Bauer, Morgan Hill; Walter A. Lobitz, Westwood, all of Calif.

[73] Assignee: Wiltron Company, Morgan Hill, Calif.

[21] Appl. No.: 295,257

[22] Filed: Jan. 9, 1989

[51] Int. Cl.$^5$ .......................... H04J 1/16; H04J 3/14
[52] U.S. Cl. .................................. 370/13.1; 370/15; 371/20.5; 371/20.2
[58] Field of Search ................ 370/13, 13.1, 15, 16; 375/3, 3.1; 379/4, 5; 371/20.2, 20.5

[56] References Cited

U.S. PATENT DOCUMENTS

| | | | |
|---|---|---|---|
| 4,059,729 | 11/1977 | Eddy et al. | 370/15 |
| 4,402,075 | 8/1983 | Bargeton et al. | 370/15 |
| 4,425,662 | 1/1984 | Jeandot | 371/20.2 |
| 4,564,933 | 1/1986 | Hirst | 370/15 |
| 4,630,268 | 12/1986 | Rodenbaugh | 371/22 |
| 4,686,668 | 8/1987 | Koseki et al. | 370/15 |
| 4,688,208 | 8/1987 | Kawaguchi | 379/5 |
| 4,688,209 | 8/1987 | Banzi, Jr. et al. | 379/5 |

OTHER PUBLICATIONS

Snow et al., "Digital Data System: System Overview", The Bell System Technical Journal, vol. 54, No. 5, May-Jun., 1975, pp. 811-832.
TA-TSY-000077, "Digital Channel Banks-Requirements for Dataport Channel Unit Functions", Issue 3, Apr. 1986, Bell Communications Research, Inc.
TA-TSY-000055, "Basic Testing Functions for Digital Networks and Services", Issue 3, Apr. 1987, Bell Communications Research, Inc.
TA-TSY-000053, "Centralized Fault Location for Digital Transmission Systems", Apr. 1985, Bell Communications Research, Inc.
Akagi Shigeyuki et al., U.S. Pat. No. 4,271,513, Issued: 81/06/02, Abstract Only.
Canniff, U.S. Pat. No. 4,380,810, Issued: 83/04/19, Abstract Only.

Primary Examiner—Douglas W. Olms
Assistant Examiner—Wellington Chin
Attorney, Agent, or Firm—Fliesler, Dubb, Meyer & Lovejoy

[57] ABSTRACT

A fault-location operating system for use with transmission networks using repeaters with loopback capabilities. A plurality of bidirectional transmission links $L_i$, for $i=1$ through N, are used for transmission of data between the terminals. A test control unit is connected at the first terminal to the first end of the first transmission link $L_1$, and controls transmission of control signals across the first transmission link $L_1$. A plurality of repeaters $R_i$, for $i=1$ through $N-1$, are used for interconnecting the plurality of bidirectional links. Each repeater $R_i$ is connected to the first end of one transmission link $L_i$ and to the second end of another transmission link $L_{i+1}$. Each repeater includes a first circuit for repeating data transmitted from the one transmission link $L_i$ for transmission on the other transmission link $L_{i+1}$, and a second circuit for repeating data transmitted from the other transmission link $L_{i+1}$ for transmission on the one transmission link $L_i$. In addition, a loopback circuit is included in each repeater that is responsive to the control signals on the one transmission link $L_i$ for looping back data transmitted from the one transmission link $L_i$ for transmission back on the one transmission link $L_i$. In this system, each repeater has a loopback capability responsive to control signals sent through the transmission links. The loopback capability can be provided in other elements in the network so that a single test control unit can be used to located faults anywhere within the network.

102 Claims, 21 Drawing Sheets

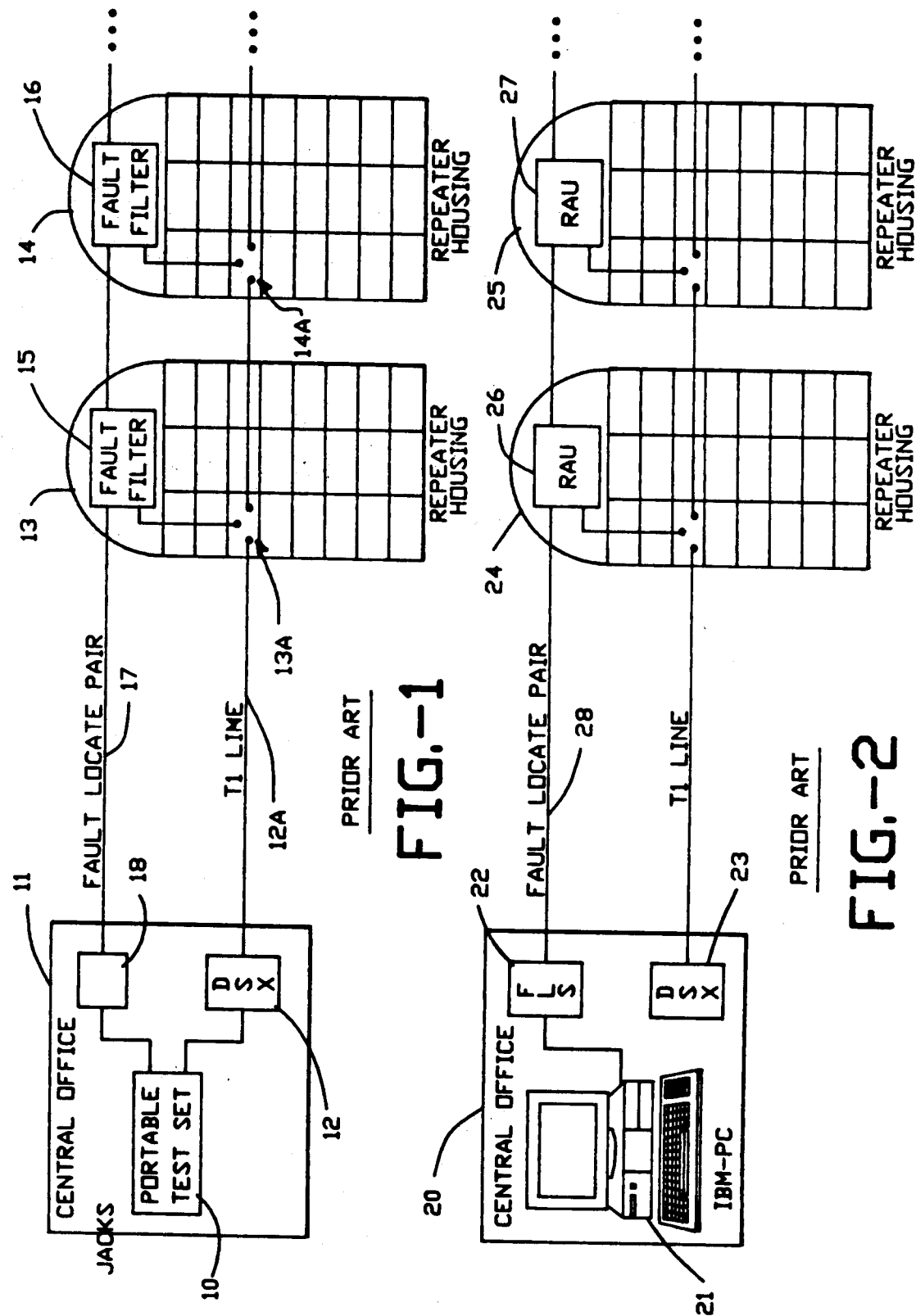
PRIOR ART
FIG.-1
PRIOR ART
FIG.-2

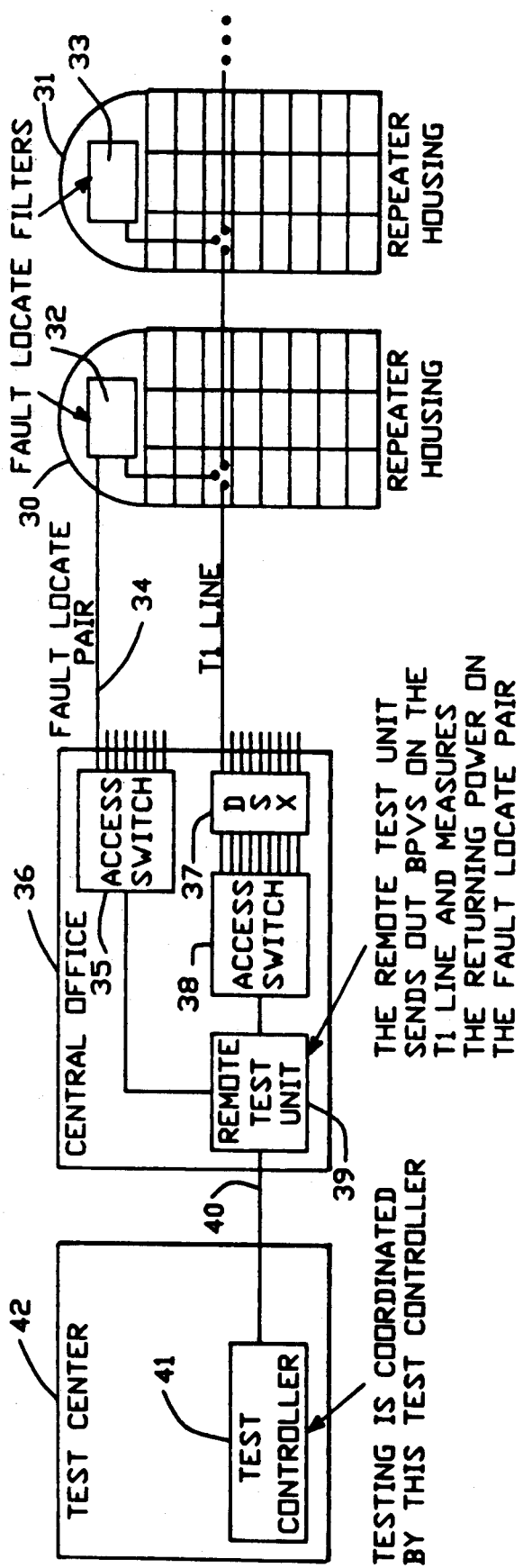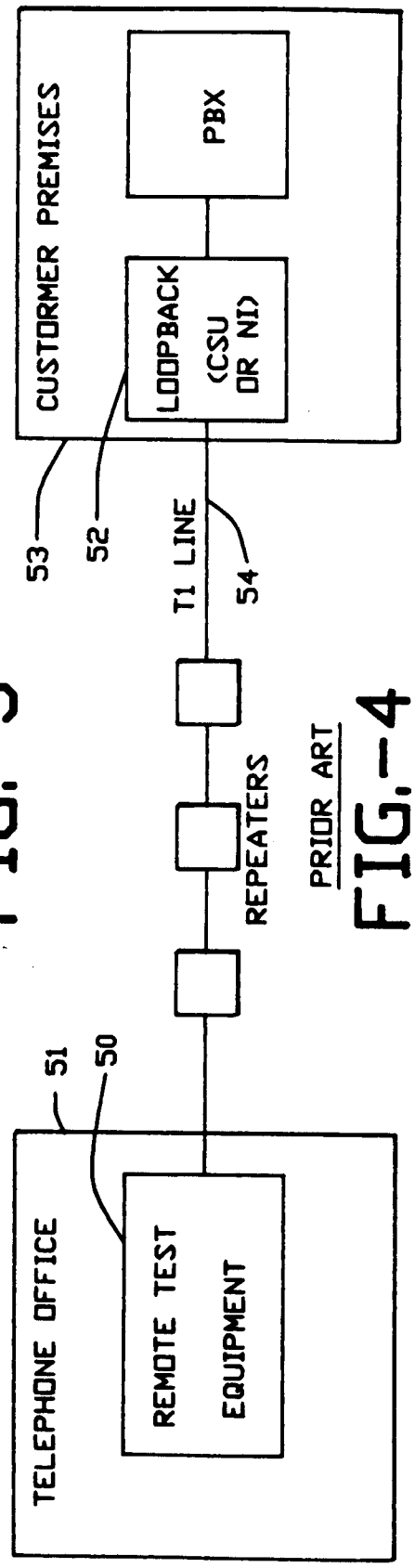

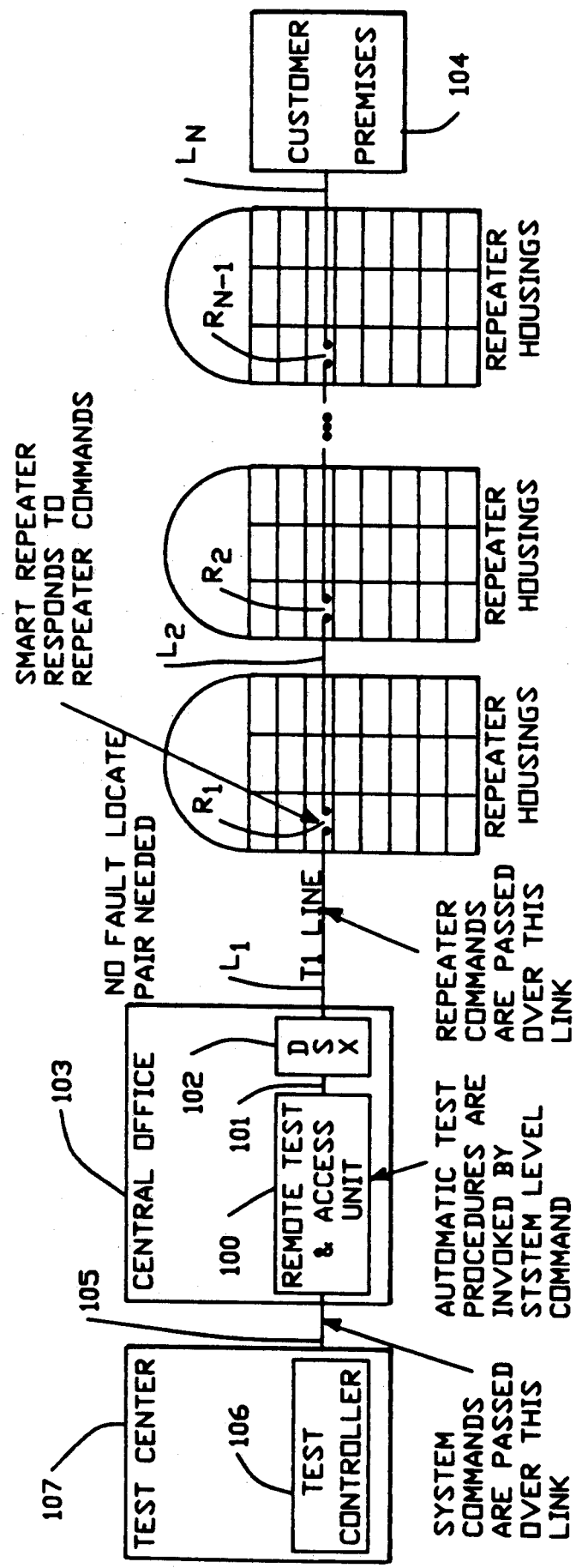
FIG.-5
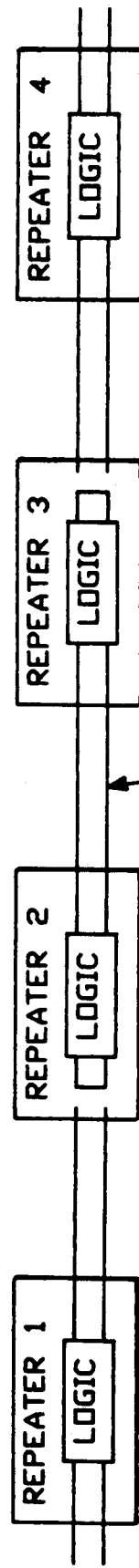
FIG.-14

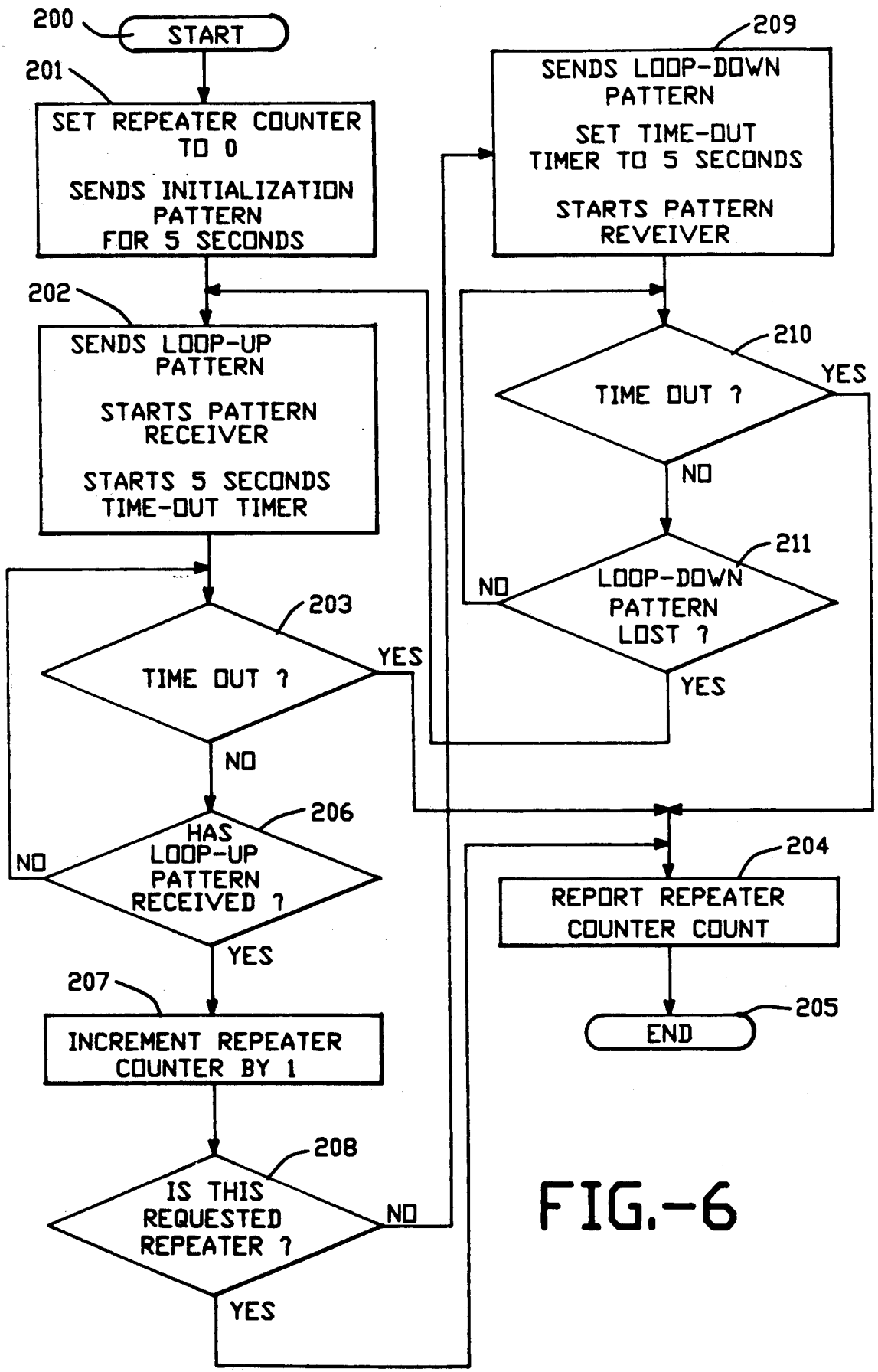
FIG.-6

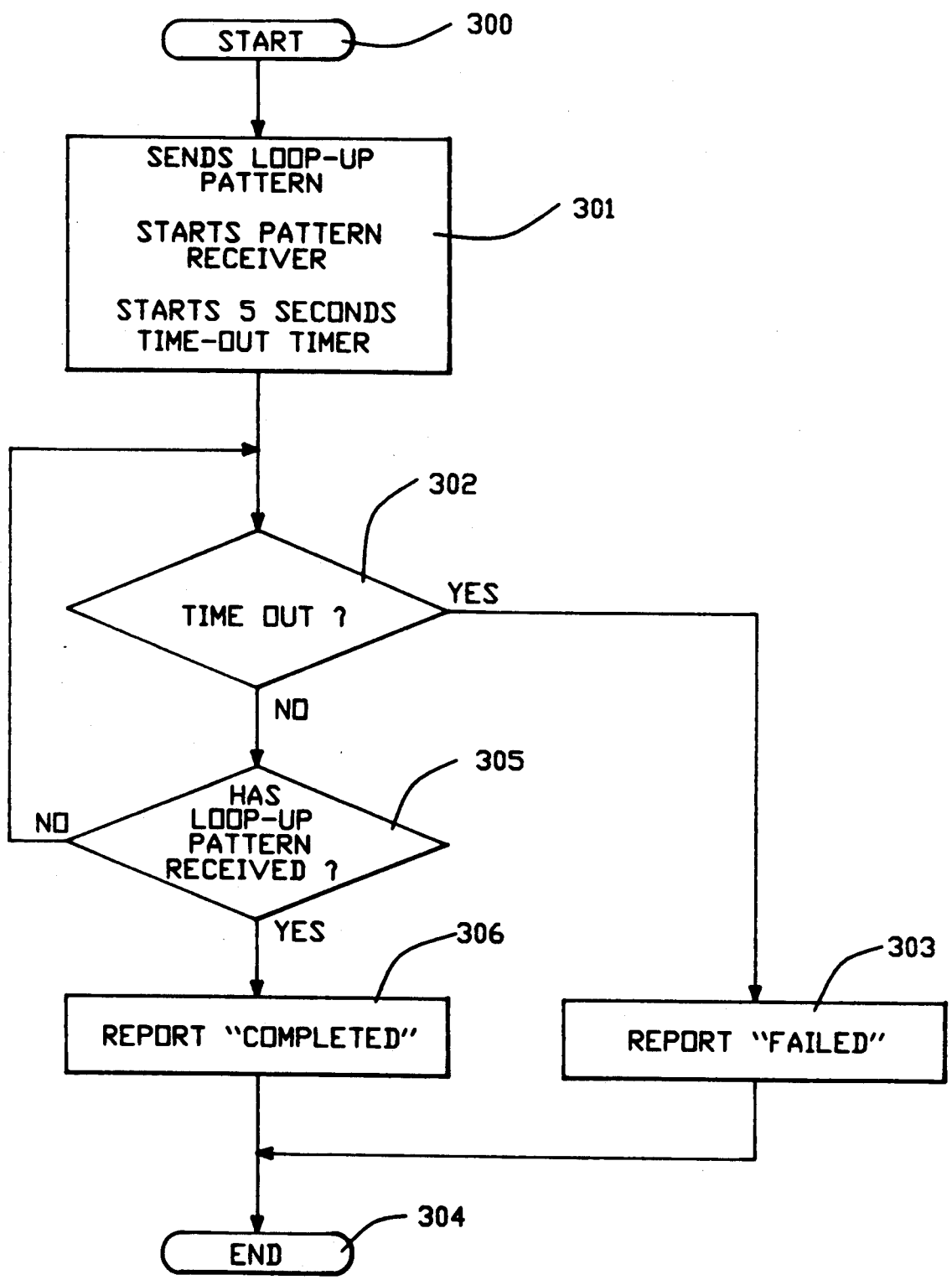
FIG.-7

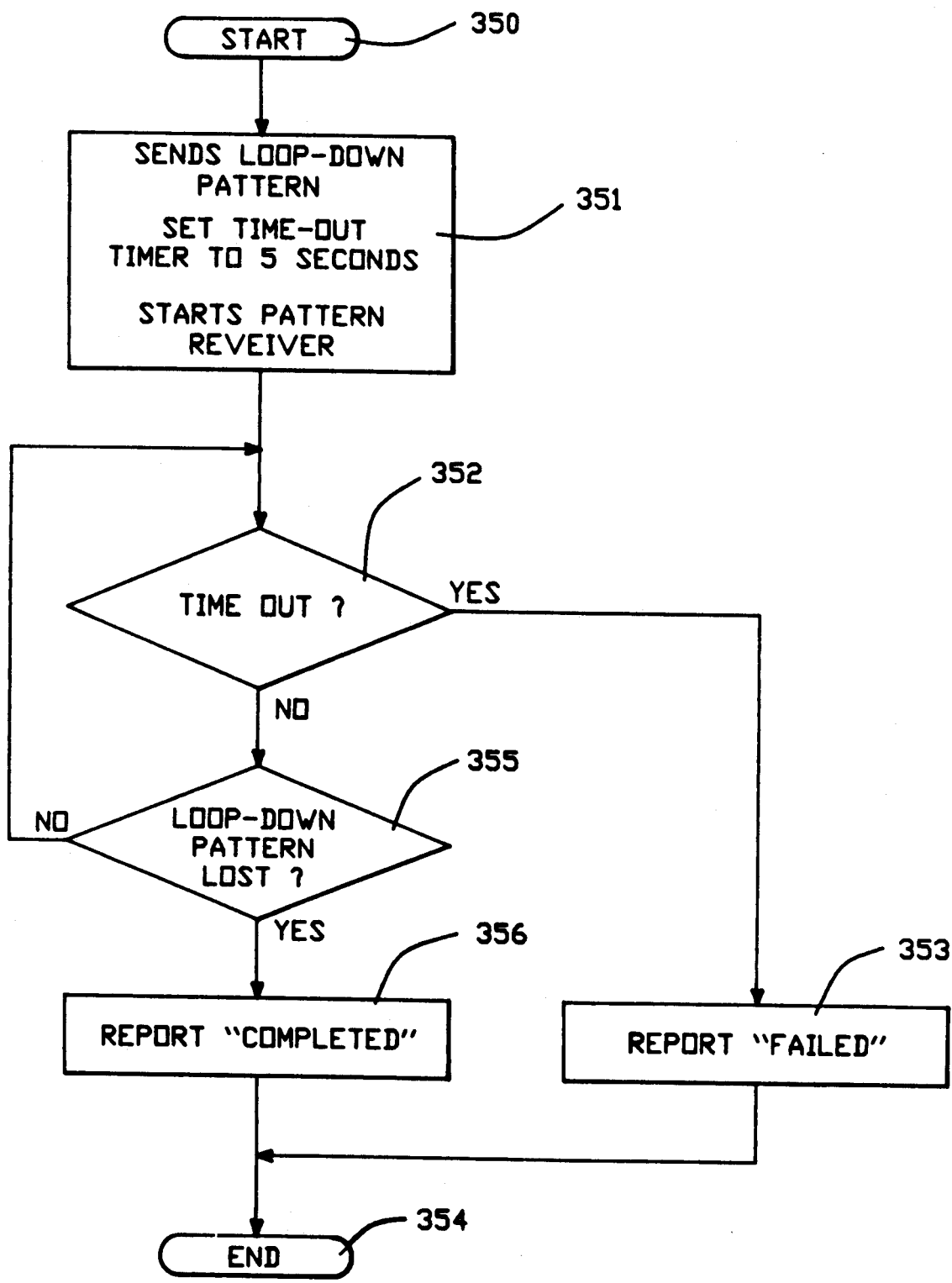
FIG.-8

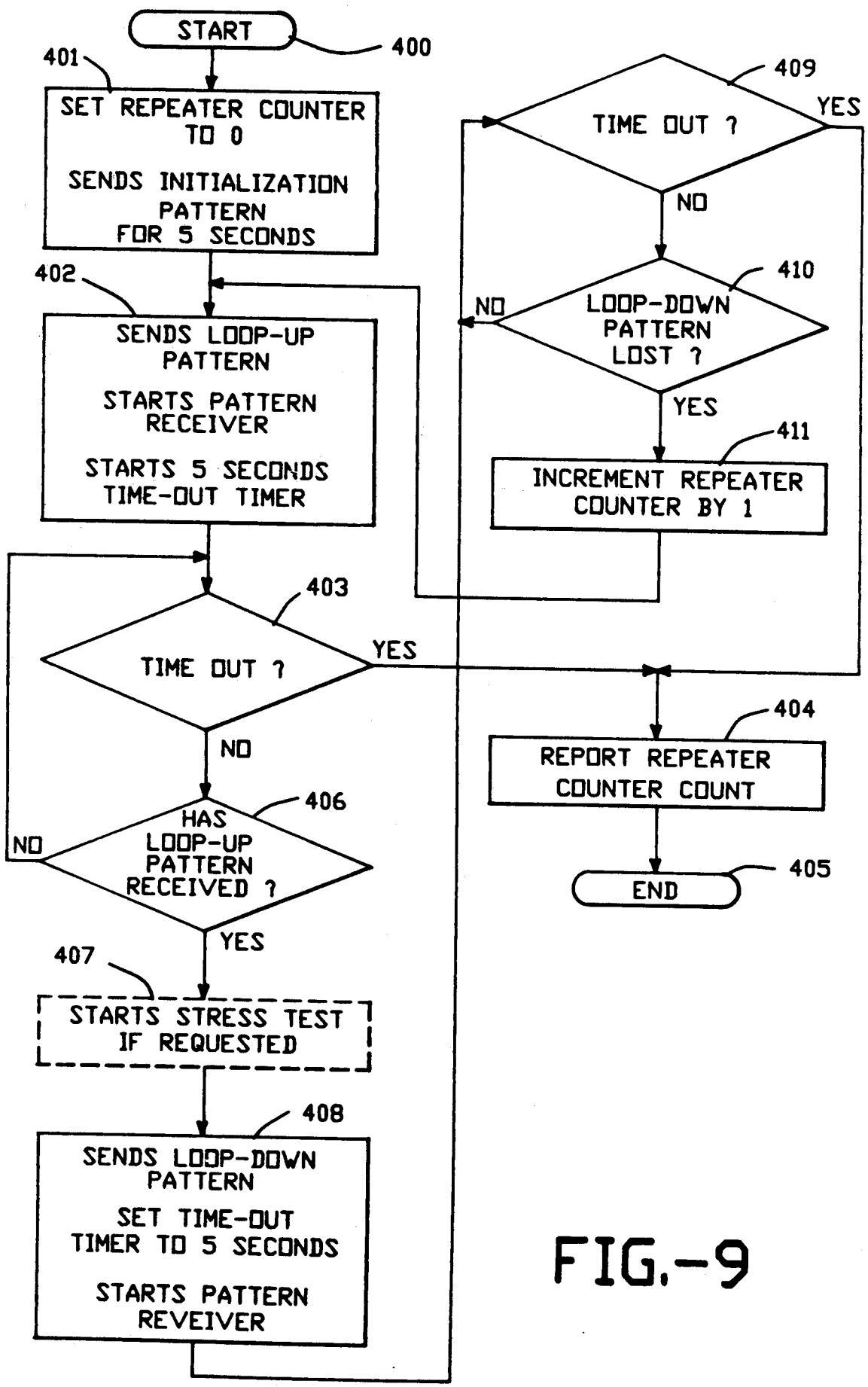
FIG.-9

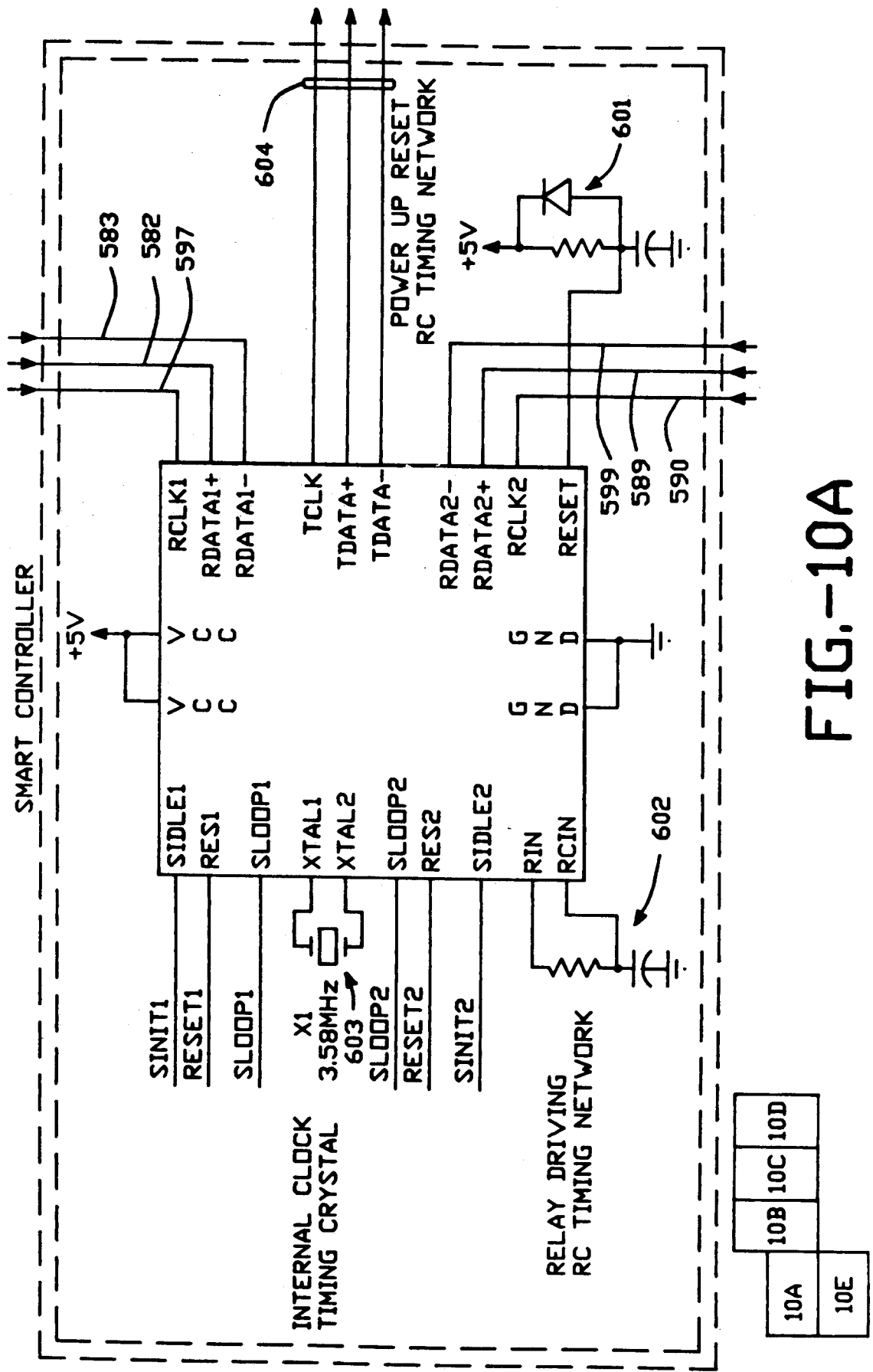
FIG.-10A

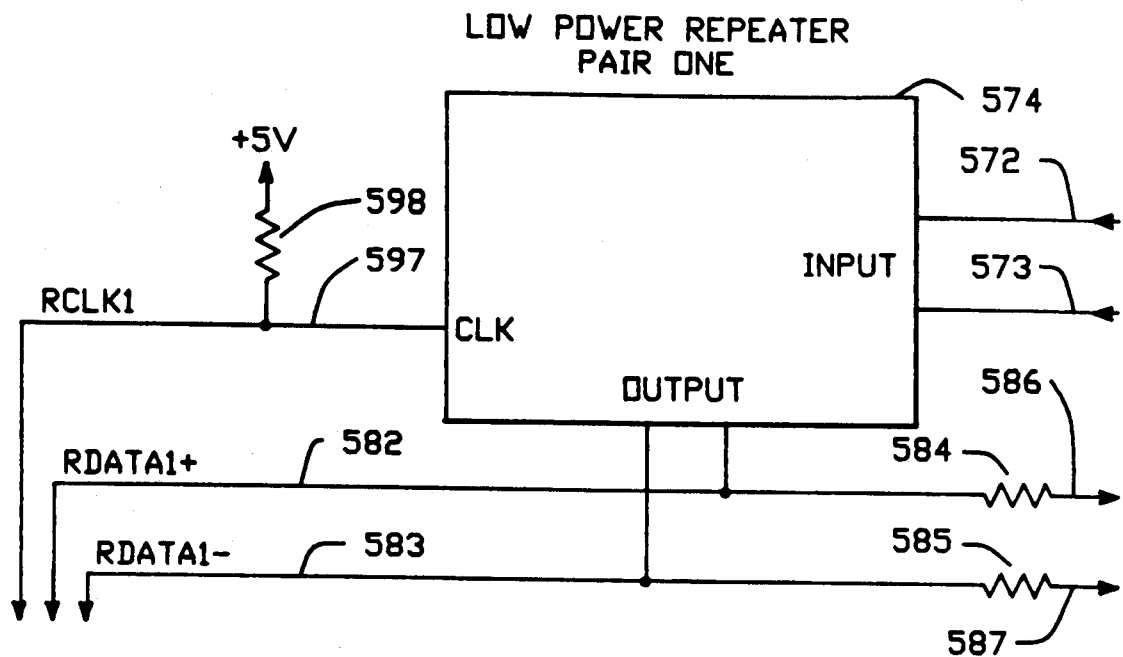
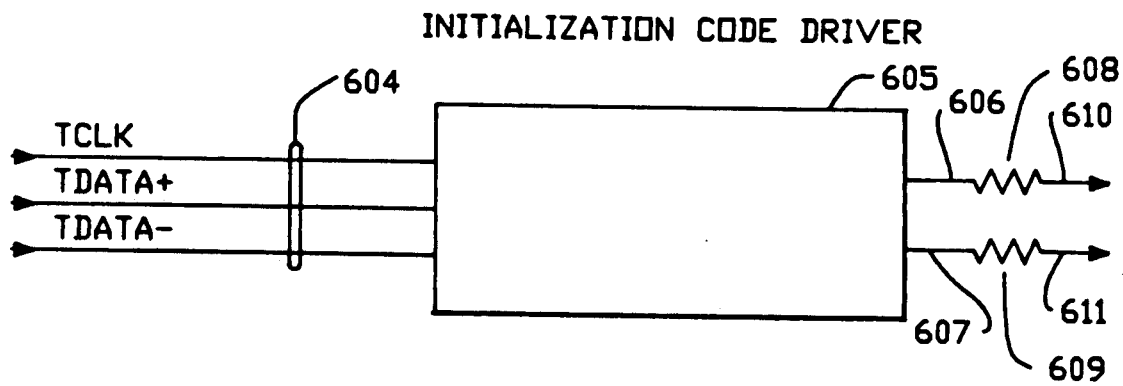
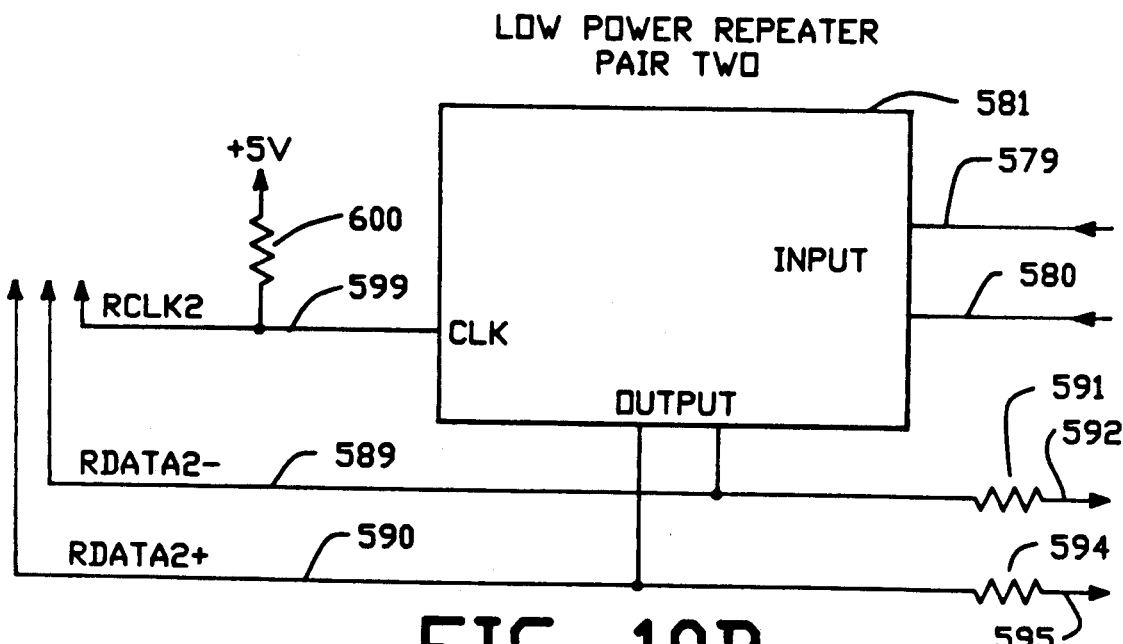
FIG.-10B

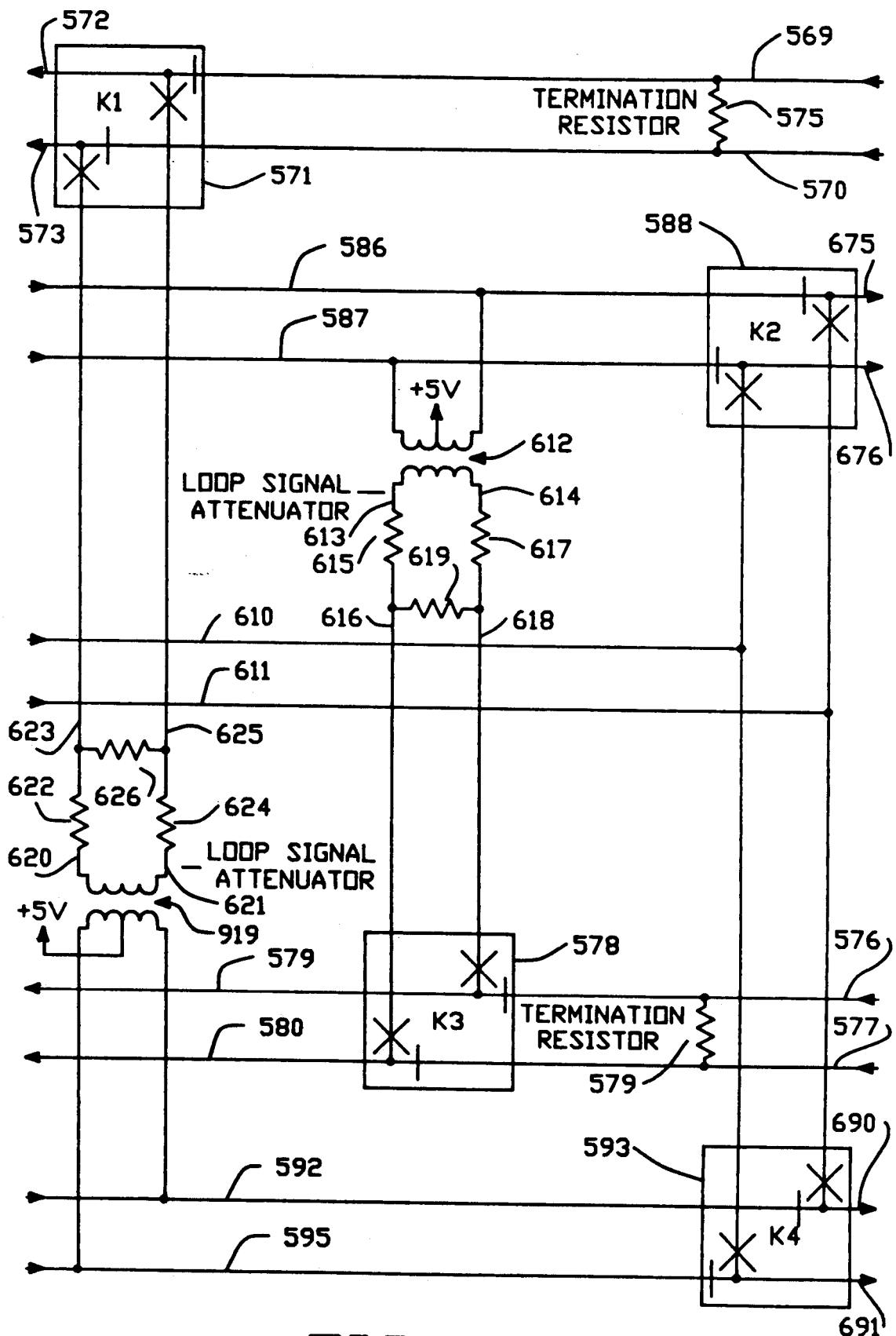
FIG.-10C

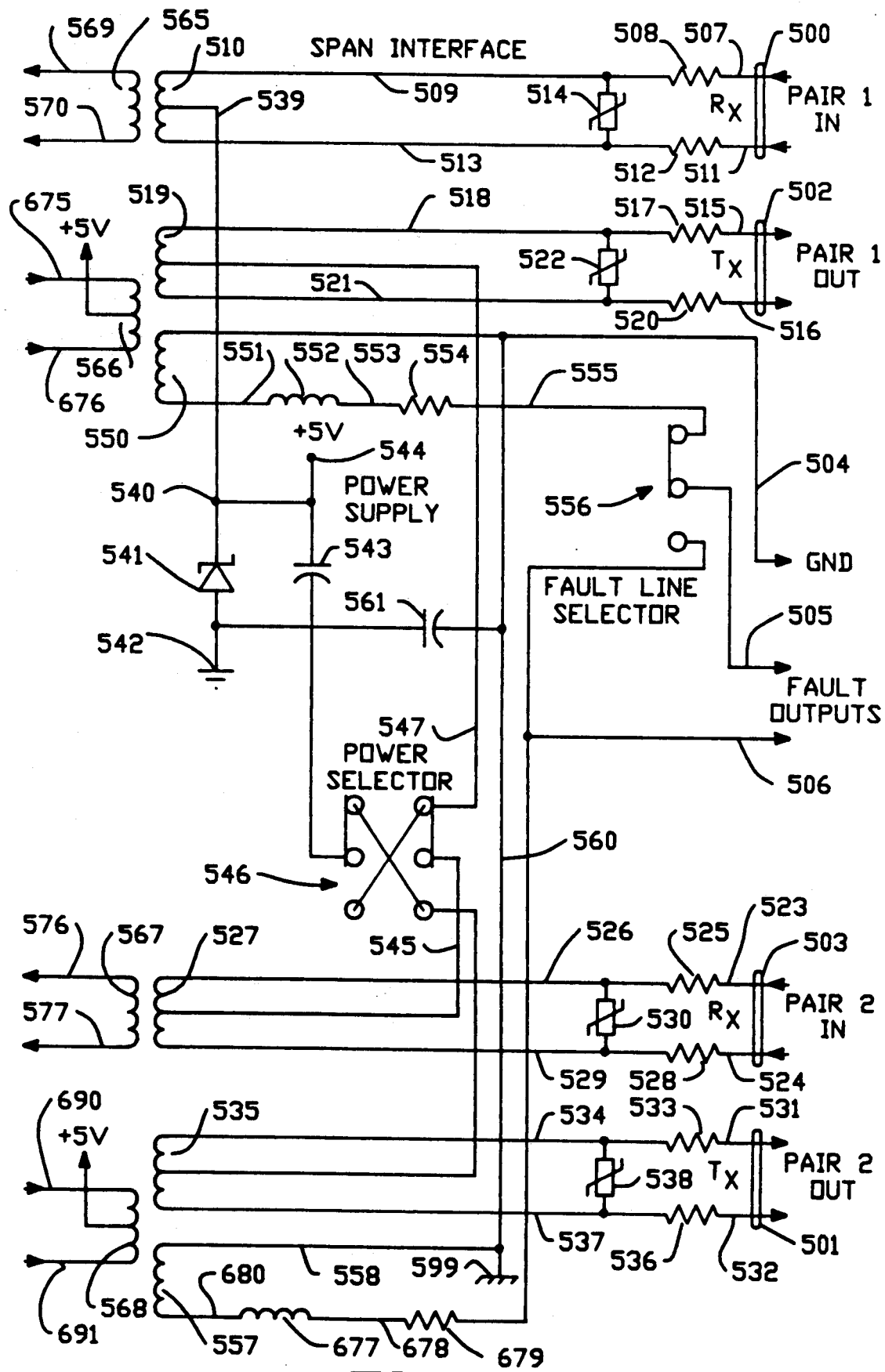
FIG.-10D

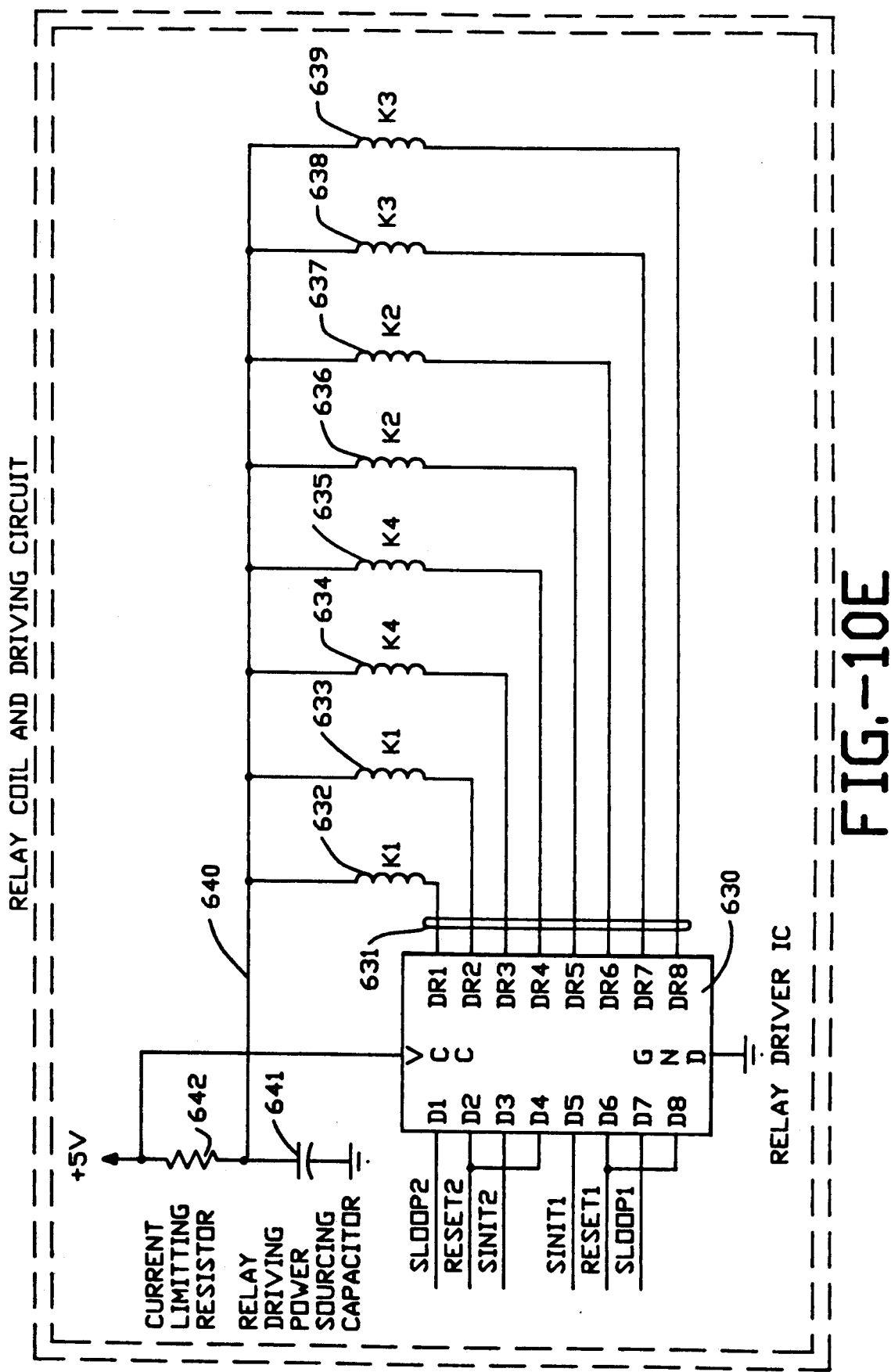
FIG.-10E

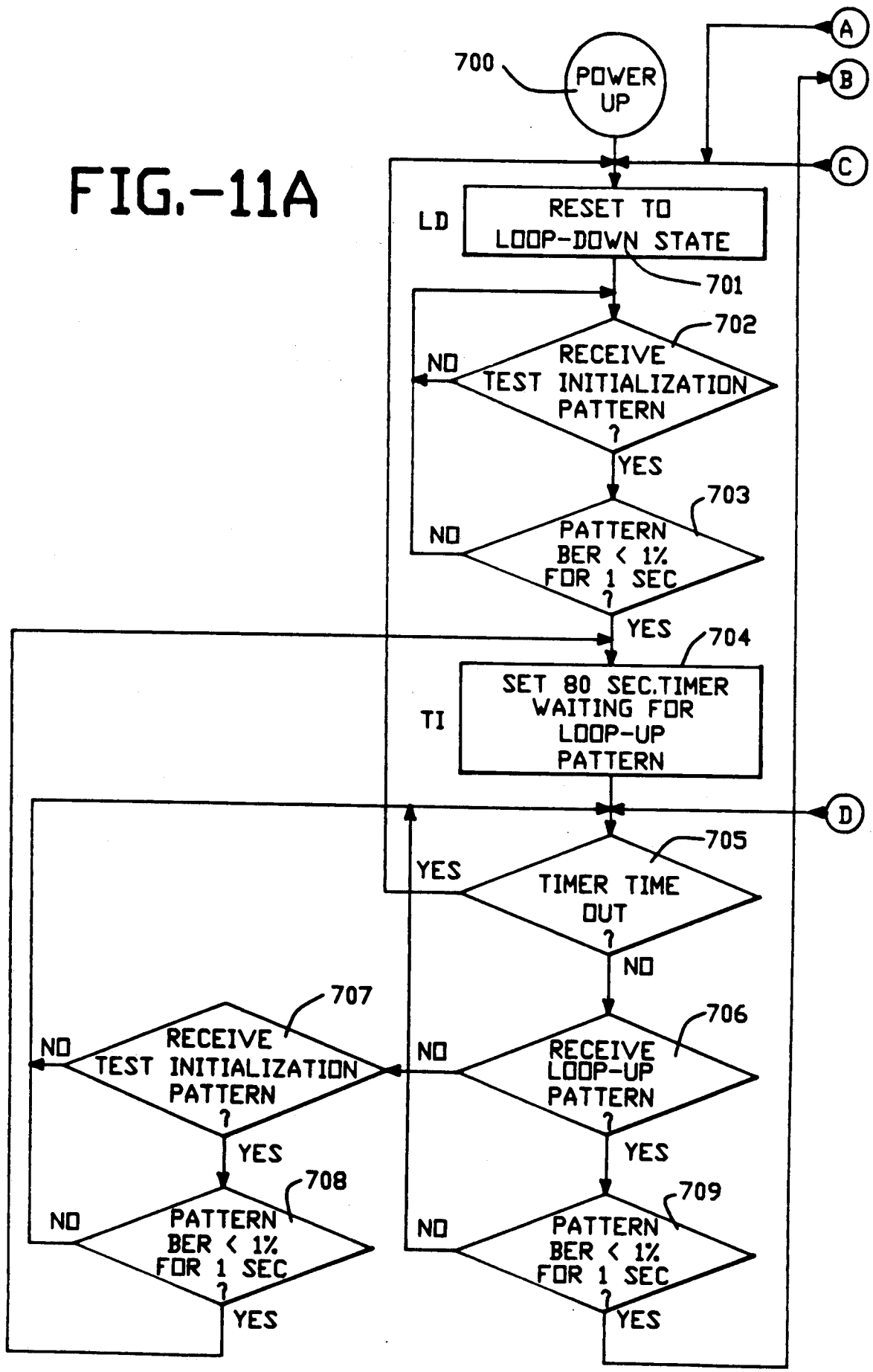

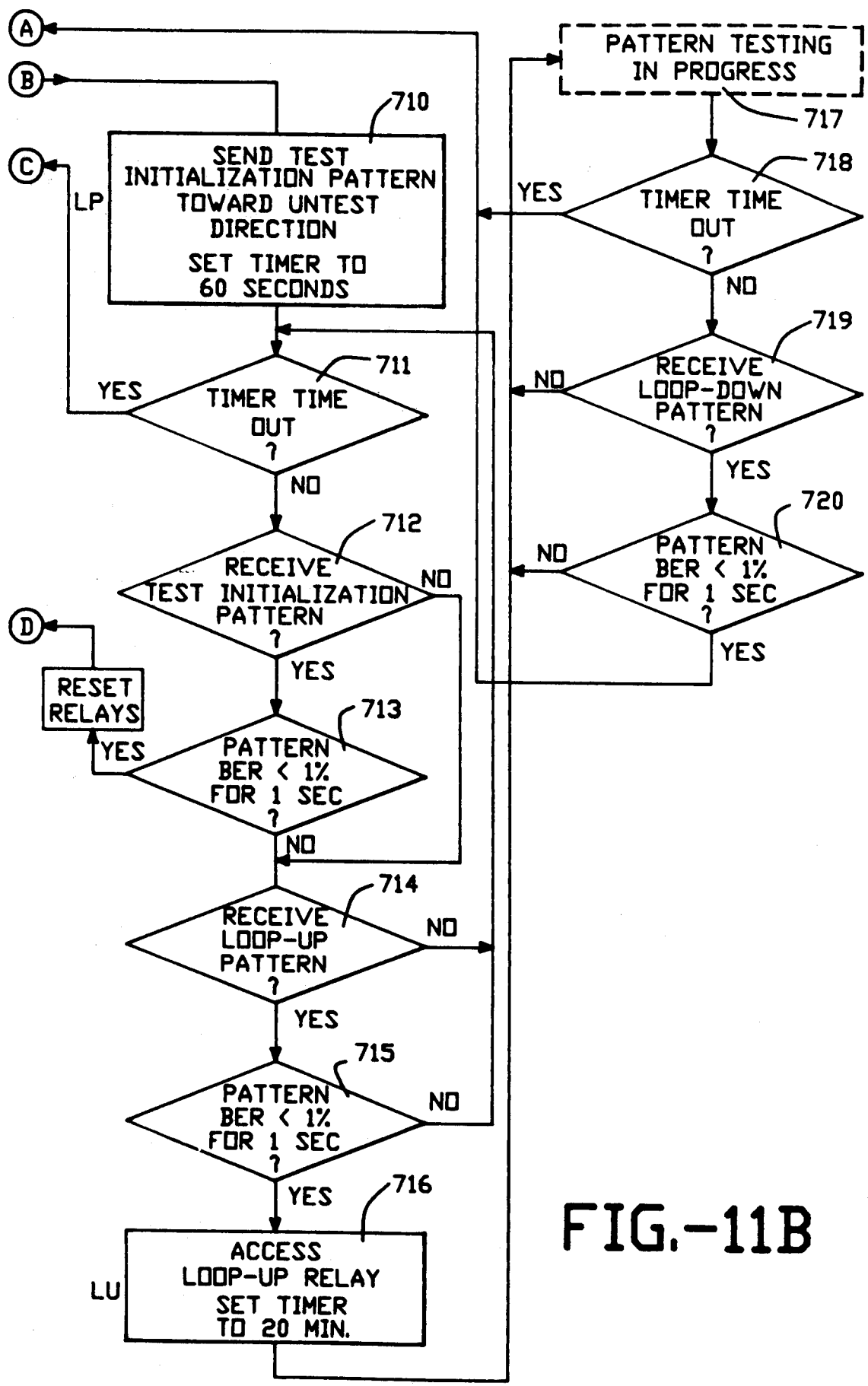
FIG.-11B

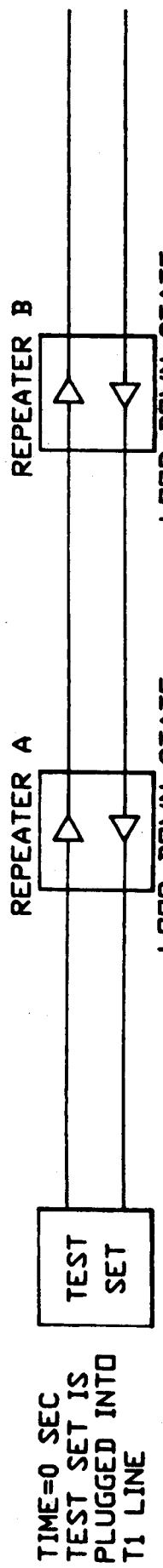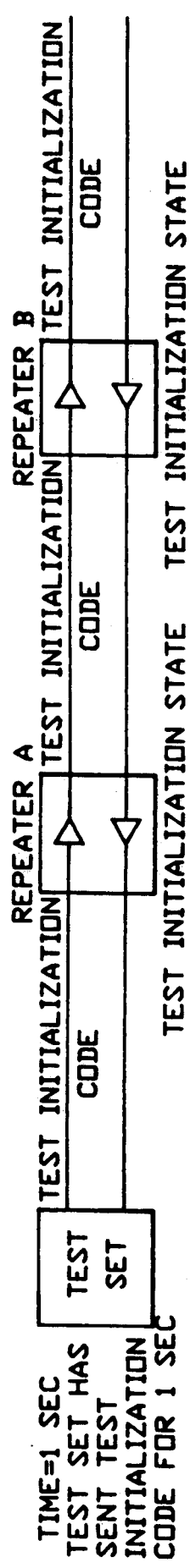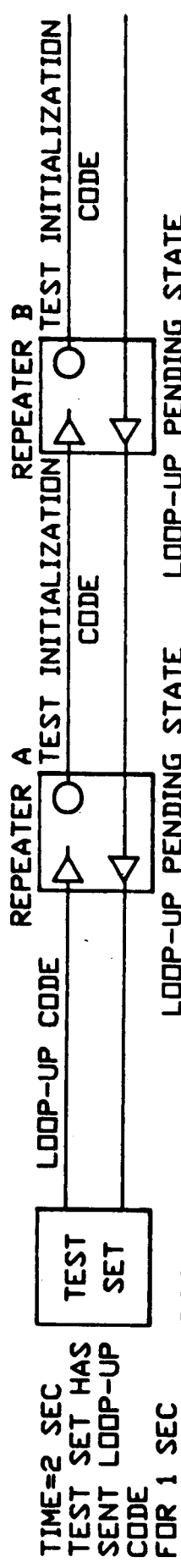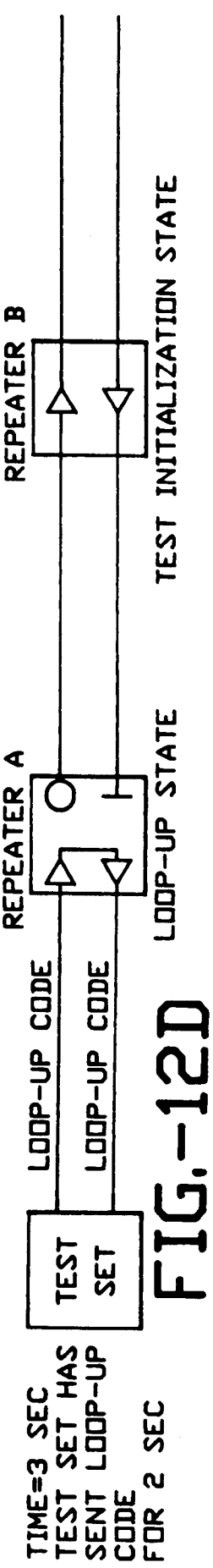

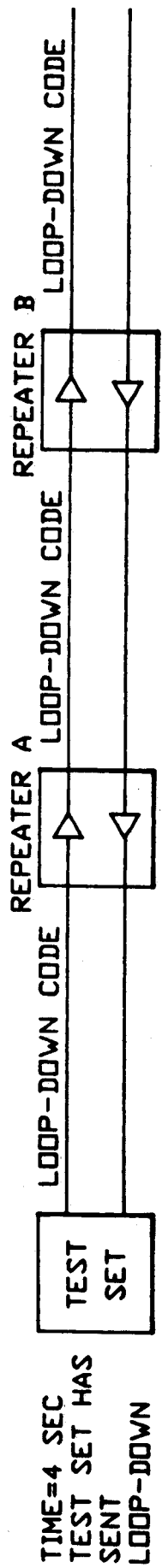
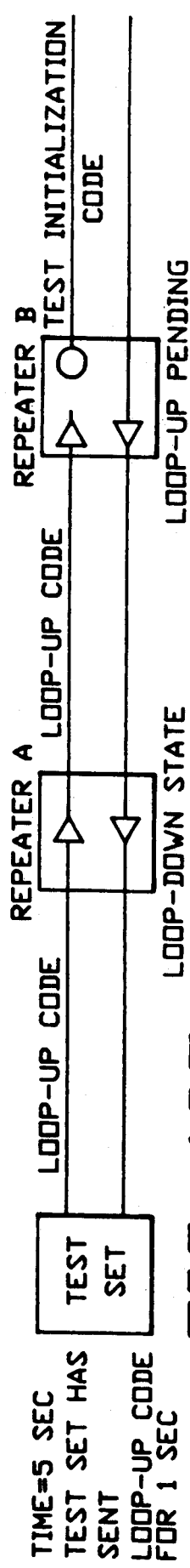
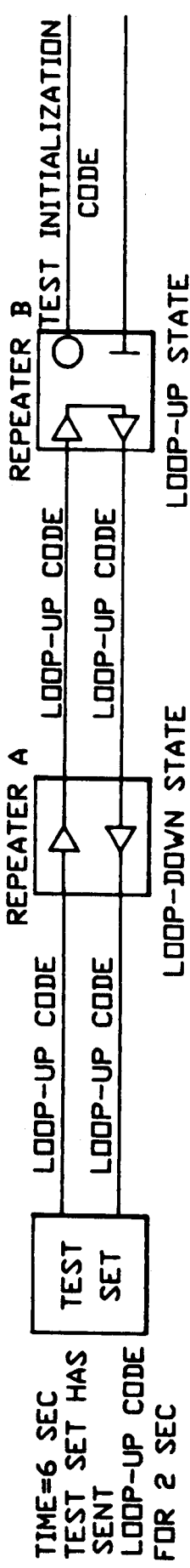
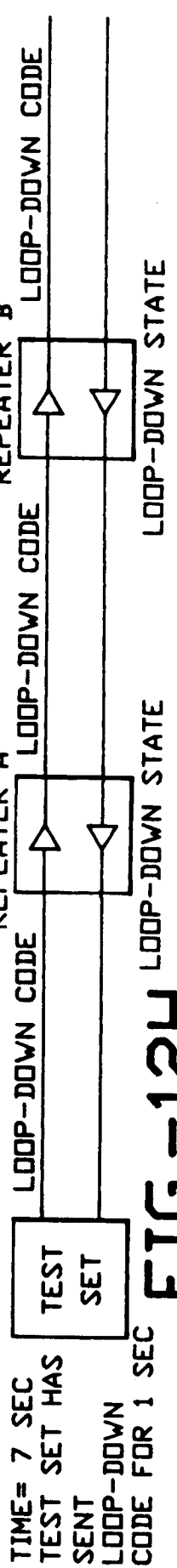
FIG.-12E FIG.-12F FIG.-12G FIG.-12H

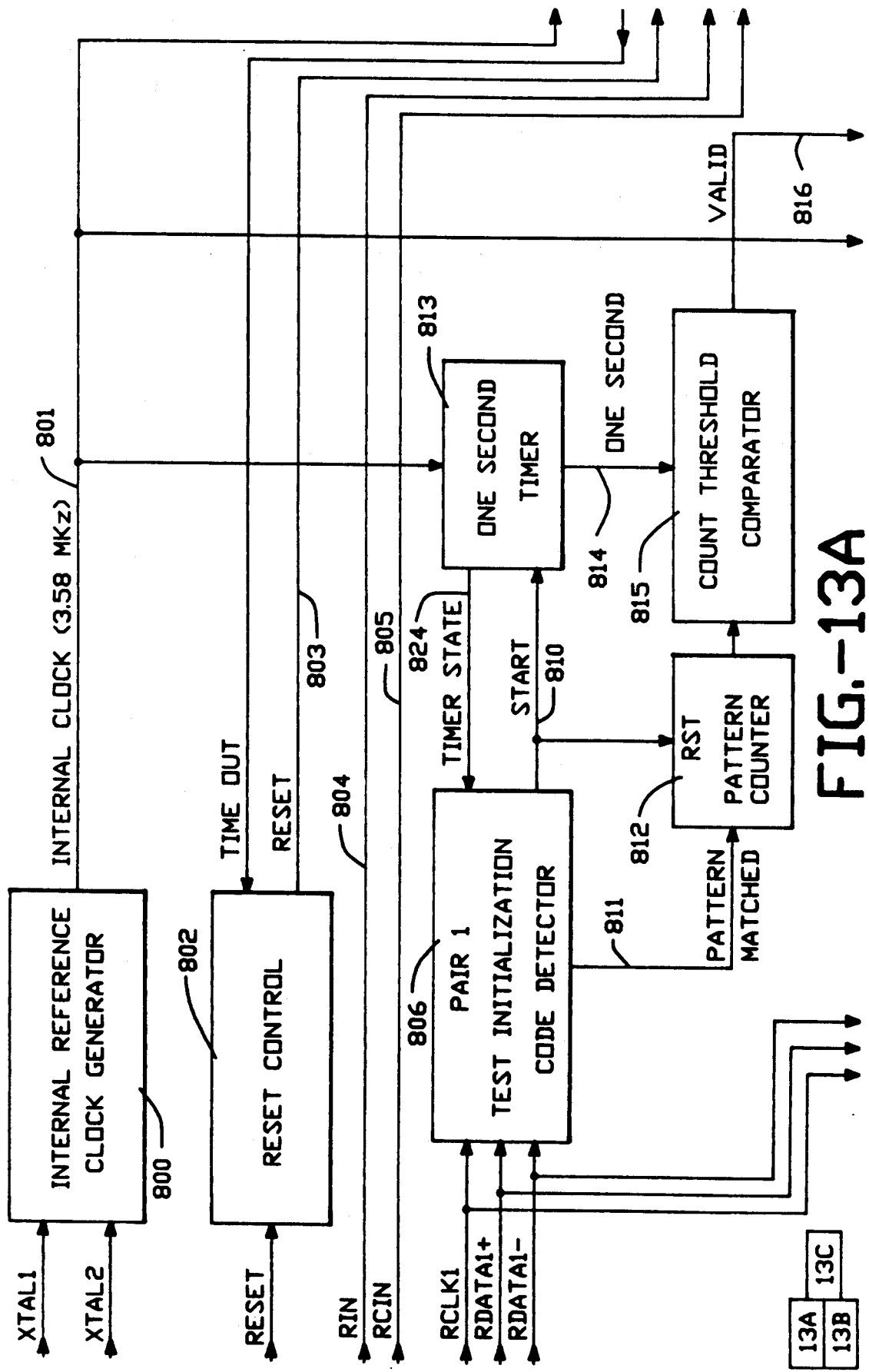
FIG.-13A

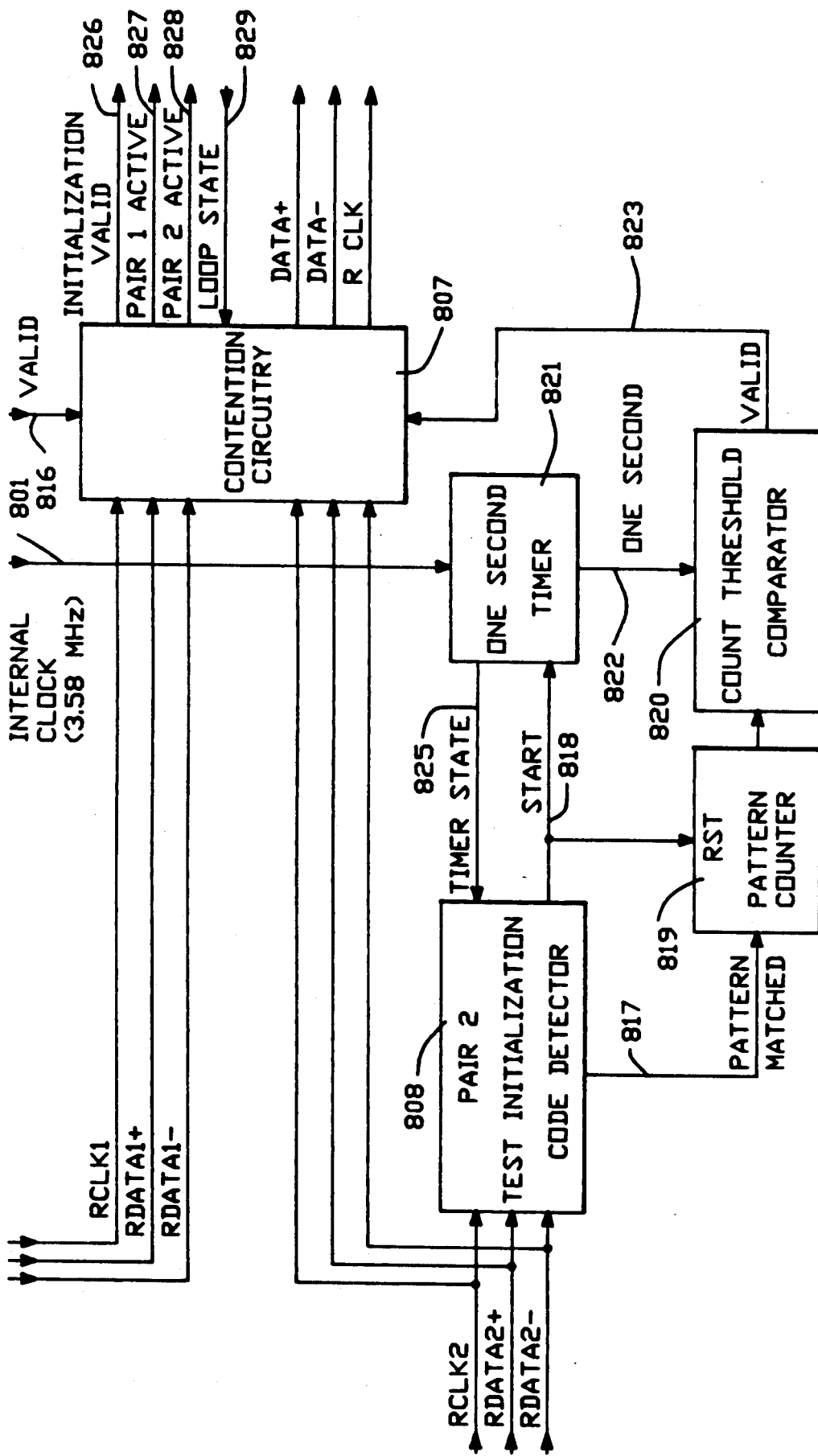
FIG.-13B

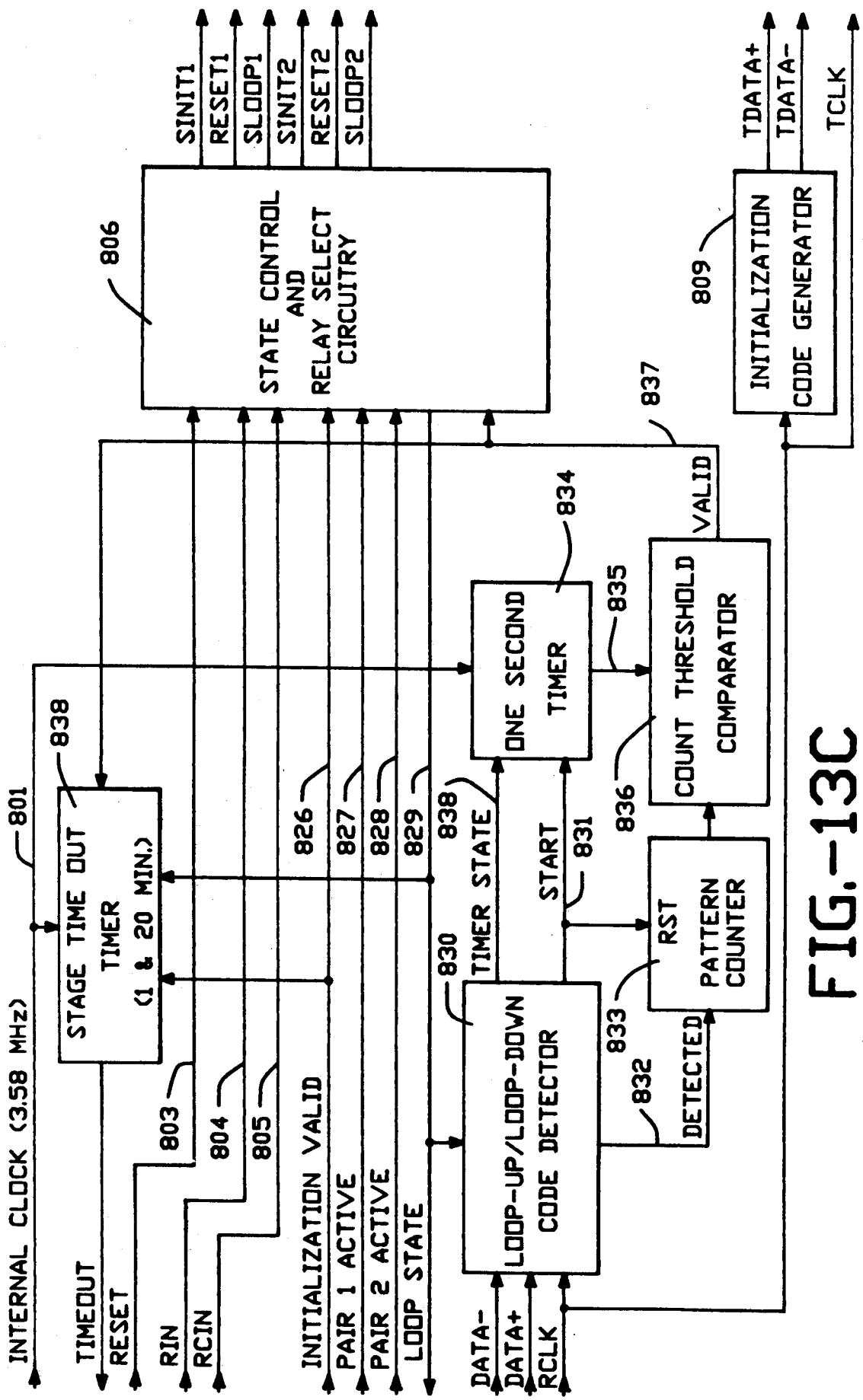
FIG.-13C

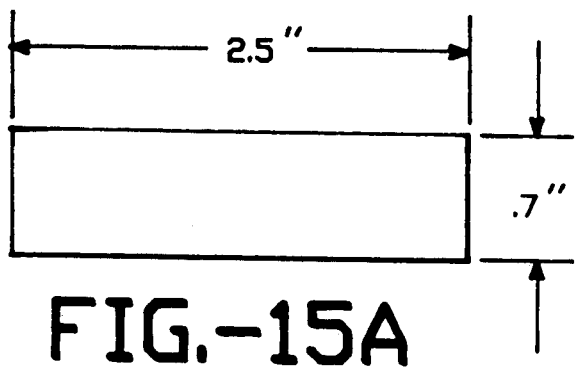
FIG.-15A
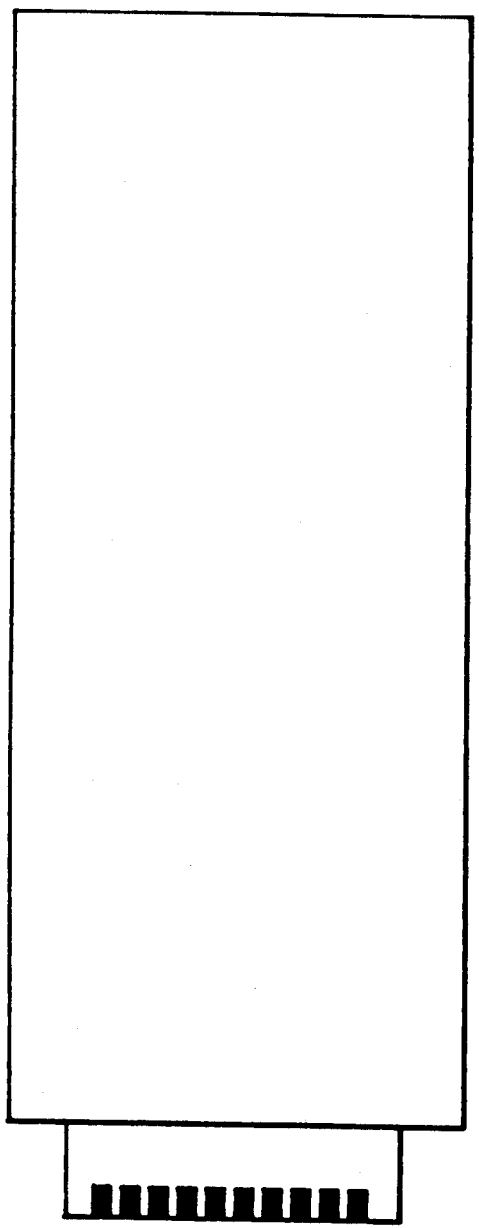
FIG.-15B
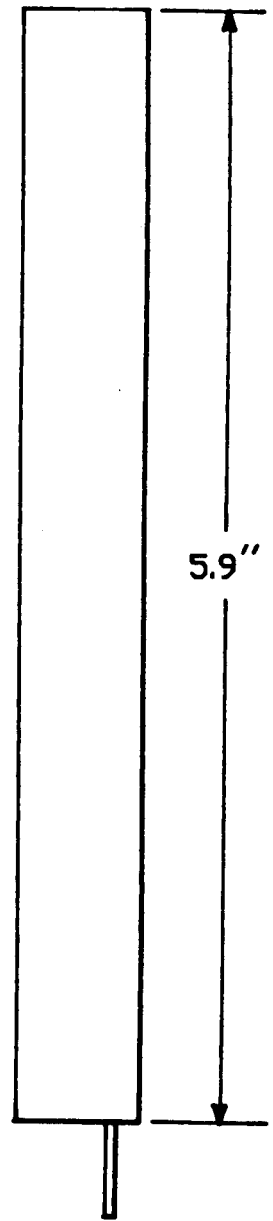
FIG.-15C

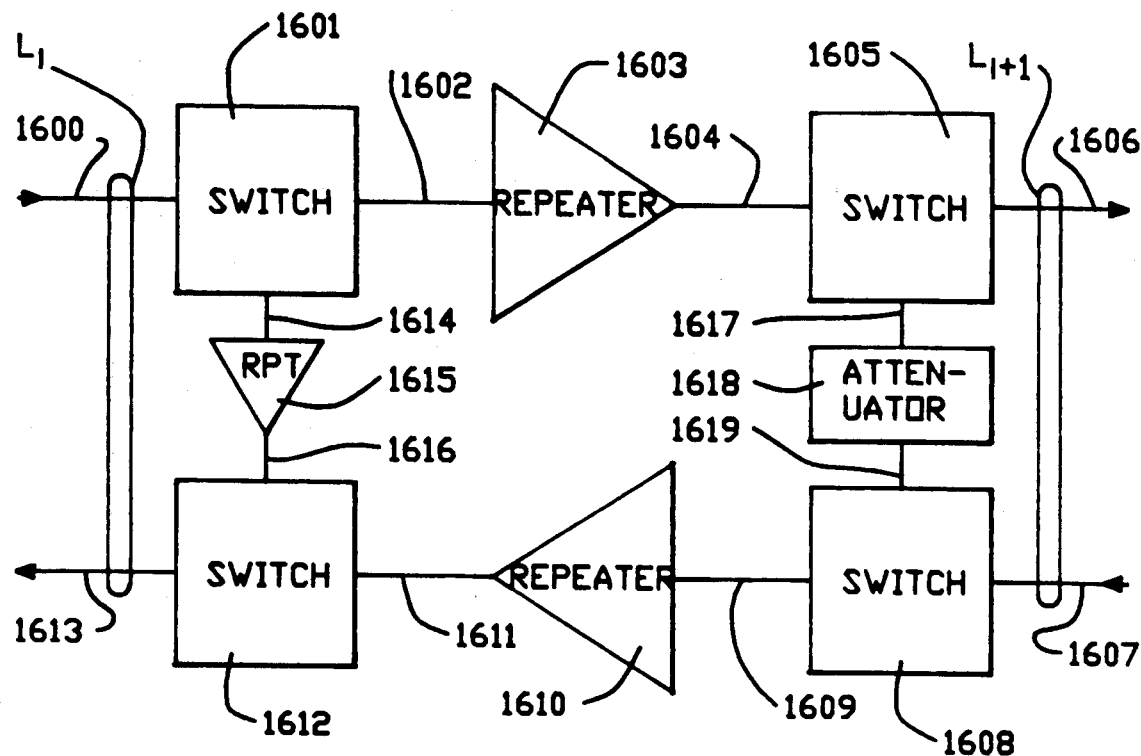
FIG.-16
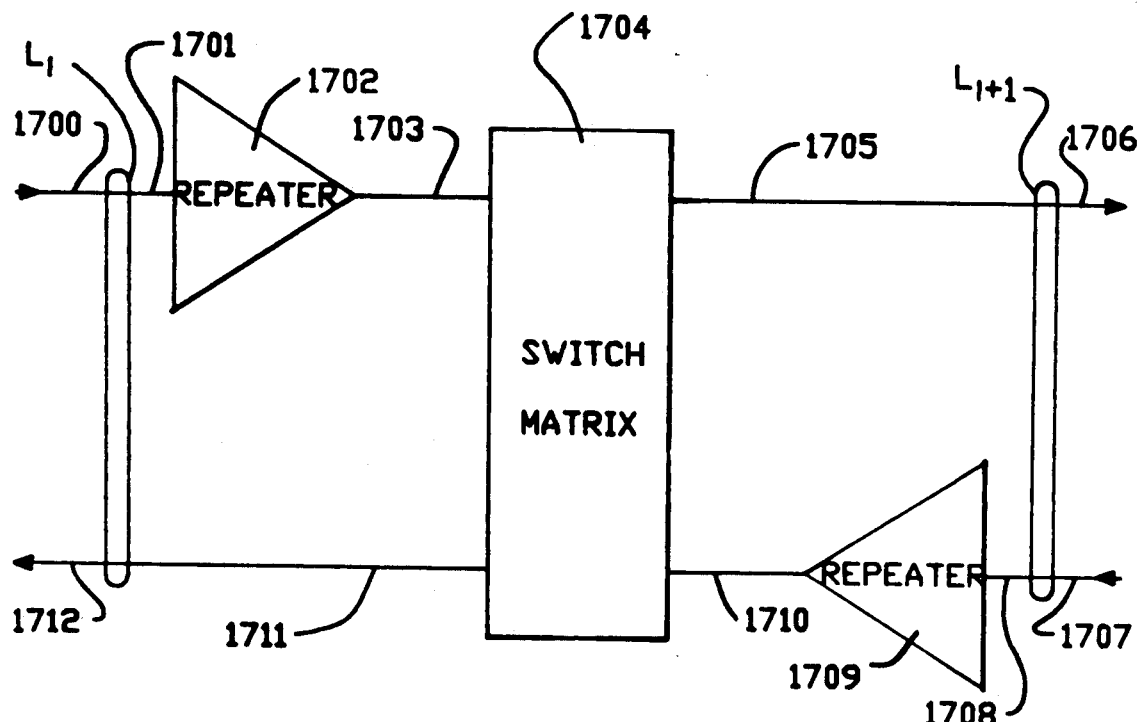
FIG.-17

FAULT LOCATION OPERATING SYSTEM WITH LOOPBACK

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

FIELD OF THE INVENTION

The present invention relates to systems for locating faults spaced along a transmission line; and, in particular, to systems for automatically performing fault location sequences in a digital transmission network with repeaters capable of loopback.

DESCRIPTION OF RELATED ART

T1 technology is one of the oldest digital transmission standards in use in networks today. Since T1 technology was introduced over 20 years ago, many advances have been made in digital transmission. For instance, where T1 began as at 1.544 Mbps, the latest optical fiber technology is now transmitting at 1.4 Gbps. Also, DDS, a newer services-oriented digital transmission technology, transmits at rates as low as 2.4 Kbps. Nonetheless, T1 remains a popular, growing, and efficient transmission technology, especially for the new T1 services dedicated to specific customers.

The fault location system used for T1, referred to as T1 Fault-Locate Filter Method, is very old and, unlike the base T1 technology, is becoming obsolete. The advent of dedicated T1 services has put additional pressure on the telephone companies to make the fault location process faster and more accurate—customers paying large fees for their dedicated service demand immediate service restoral when the T1 line fails.

Thus, the embedded T1 Fault-Locate Filter Method has come under close scrutiny in the last five years as people have searched for a better way to perform the fault location process. Three and a half years ago, Bellcore, the research and standards arm of the Regional Bell Operating Companies, completed a proposed standard on how it thought T1 fault location could best be done. California Microwave introduced another system, known as CD-94 RPM, 2 years ago using a different method. The Fault-Locate Filter, the Bellcore proposal, and the CD-94 system are representative of the prior art.

A. The Fault-Locate Filter Method

When T1 technology was introduced over 20 years ago, the Fault-Locate Filter Method was used. That technology is schematically illustrated in FIG. 1. Systems implementing the Fault-Locate Filter Method include a portable test set 10 which is connectable at a central office 11 to the cross-connect frame (DSX) 12 which provides access to the T1 transmission line 12A. Each repeater housing 13, 14 includes a fault filter 15, 16 which is coupled to a fault locate pair 17 for transmitting fault information back to central office 11. A fault locate terminal 18 in the central office 11 is coupled to the fault locate pair and to the portable test set 10. In order to identify faults in the repeaters 13A, 14A along the transmission line 12A, the technician using the portable test set 10 follows the procedure outlined below.

A.1 First the technician accesses the T1 line at the DSX 12 bay. Then the technician uses the specialized portable test set 10 to send a special pattern of BiPolar Violations (BPVs) out on the T1 line. The BPVs are sent at a rate which corresponds to a particular voice frequency. As a note of explanation, a T1 signal is a 1.544 Mbps digital signal that transmits ones and zeroes. A 1 is transmitted as a pulse, and a 0 is transmitted by the absence of a pulse. The signal is bipolar, which means that each 1 has the opposite polarity of the 1 before and after it. A BPV occurs when two consecutive ones are transmitted with the same polarity. If a steady stream of 1s were transmitted on the T1 line, and one BPV occurred for every millisecond, then the BPVs would be occurring at a rate of 1.544 kHZ, a voice frequency rate.

A.2 The repeater card 13A, 14A has a choke which filters out the high frequency 1.544 Mbps signal and passes the audio frequency of the rate of occurrence of BPVs.

A.3 The audio signal is passed to the fault filter 15, 16 in the repeater housing 13, 14. The fault filter 15, 16 is a band pass filter that passes only one particular audio frequency. Different repeater housings have fault filters with different bandpass frequencies, and the technician knows which repeater housing will respond to a particular frequency. If the BPV pattern is at the right voice frequency, then the fault filter passes the signal onto the fault locate pair 17.

A.4 The portable test set 10 at the central office 11 measures the power of the returning signal on the fault locate pair 17. Absence of a power level signifies an inoperative repeater, and an unusual power level may signify a faulty repeater. Interpretation of the power measurement is the crucial part of determining which repeater needs replacement.

A.5 The fault locate filter method has several disadvantages. It requires the availability, good condition and administration of fault locate pairs. It is inadequate for testing marginal problems because the actual T1 signal itself is not measured. Instead, the technician has to interpret the measurement of the power level on the fault locate pair. In some areas the fault locate pairs have not been kept up and are no longer available. The fault-locate filter requires that a person be available in each office and have accurate records of how the fault locate filters are deployed in the various repeater housings. During installation of the repeater housing, the technician must know to which position to set the fault filter. Finally, the audio signal which is placed on the fault locate pair is of relatively low power. When the T1 line is over 5 miles long, the power drops off to very low levels which makes measurements even more difficult to perform and interpret.

B. California Microwave CD-94 RPM

The CD-94 method has been introduced in the last two years. It is schematically illustrated in FIG. 2. A system implementing the CD-94 method includes a central office 20 having a user's terminal 21, such as an IBM PC, a fault locate shelf 22 which is coupled to the fault locate pair lines in the system, and a digital cross-connect frame (DSX) 23. The DSX 23 is coupled to a T1 line on which a plurality of repeaters 24, 25 are distributed. A remote access unit RAU 26, 27 is coupled to the T1 line and the fault locate pair 28 at the repeater housing 26, 27.

B.1 The CD-94 replaces the fault filter of the fault-locate filter method with a Remote Access Unit (RAU) 26, 27 at the repeater housing 24, 25.

B.2 The CD-94 does not require physical access to the T1 line at the Central Office in order to make measurements.

B.3 The CD-94 operates on the principal that T1 lines should not have BiPolar Violations. The RAU 26, 27 has a BPV counter that gives BPV-based bit error measurements at the repeater itself. The BPV measurements are a great step forward from the Fault Locate Pair power measurement, because the BPV measurement is one measure of the actual bit error rate on the line itself. Bit error measurements are the generally accepted measurement of today in characterizing the performance of a T1 line. Thus the use of a bit error measurement not only indicates an inoperative repeater, but it gives precise information in determining if a repeater is marginal.

B.4 BPV error rates can be monitored on demand from the central office. Using an IBM PC 21, the central office technician accesses a fault locate pair through the Fault Locate Shelf (FLS) 22. The PC 21 communicates With the RAU 26, 27 using a Hayes compatible modem. The PC commands the Remote Access Unit to perform the BPV measurement.

B.5 The CD-94 also has drawbacks. It requires time-consuming and trouble-prone rewiring to install RAUs at the repeater housings. It can't generate its own test signal from the DSX and thus requires the customer to place a signal on the line in order to make measurements. It provides no intrusive testing capability such as Quasi Random Signal (QRS), bit error rate, ones density stress tests, circuit acceptance tests, and its monitoring capability is limited to just BPVs and loss of signal. There are many different kinds of bit error measurements to make other than just BPVs. The CD-94 is not universally applicable because it requires the fault locate pairs to be in place and their records to be up to date. In T1 local loop applications, the central office equipment is a prohibitively large portion of the total system cost. The CD-94's economics are better suited to longhaul applications, yet most longhaul applications are being given to fiber systems which are not compatible with CD-94 technology. The solution is also quite expensive if just a few repeaters within a repeater housing need the monitoring capability. Finally, the CD-94 doesn't satisfy an important need of the telephone company—to take testing out of the Central Office and into a Test Center.

C. The Bellcore Technical Advisory

The Bellcore Technical Advisory, entitled Centralized Fault Location for Digital Transmission Systems, TA-TSY-000053, was issued in April 1985. Although this proposed method has been documented and widely publicized, it has never been fully accepted by the industry as being the best way to solve the problem. Consequently, applicant is not aware of any company that has yet announced intentions to design or manufacture the system.

The Bellcore proposal is schematically illustrated in FIG. 3, and is similar to the Fault-Locate Filter Method as described below. A system implementing the Bellcore proposal uses repeater housings 30, 31 with fault locate filters 32, 33 as in the Fault-Locate Filter Method. The fault locate pair 34 of a given T1 line is coupled to an access switch 35 at a central office 36. The DSX 37 is coupled through an access switch 38 to a remote test unit 39. The remote test unit is connected through a communication line 40 to a test controller 41 at a test center 42 which is established for a large network.

C.1 Similarities to the Fault-Locate Filter method.

Bellcore's proposal uses the fundamental technology already installed in the T1 system for the Fault-Locate Filter Method. The Bellcore method makes use of a remote test unit 39 to send out BPVs at particular voice frequencies on the T1 line. The appropriate fault locate filter 32, 33 converts the BPV pattern into an analog tone on the Fault Locate Pair 34. The access switch 35 routes the analog tone to the remote test unit 39, which measures the power level of the tone. In these respects, the Bellcore proposal is very close to the original Fault-Locate Filter method.

C.2 Differences of Bellcore proposal from the Fault-Locate Filter method.

The difference from the embedded system is that the Bellcore proposal adds a central test controller 41, remote test units 39, and two access switches 35, 38. With these additions, the technician could perform testing from a test center 42 rather than from the central office 36, and the productivity level would increase. Bellcore proposes equipping the Test Controller 41 with an artificial intelligence capability which would further increase technician productivity.

C.3 Problems with Bellcore's proposal.

The fundamental problem with Bellcore's proposal is that it leaves the old technology in place. Analog power measurements are too crude of a way to measure the health and performance of a digital line. Modern standards require the measurement of a bit error rate on the line in order to characterize the quality of service, and it is impossible to measure the bit error rate with the old technology. There are several secondary problems as well. The fault locate pairs must be available in order for the method to work, and these pairs are not available in many areas of the country. The method requires two kinds of access switch, one for the fault locate pairs and one for the DSX. Two switches are doubly expensive. Plus, telephone companies would like to do other kinds of T1 testing as well, but Bellcore's recommendation is limited to just repeater fault location. The remote test equipment would be more complex than it needs to be—T1 test equipment only needs to function at 1.544 Mbps speeds, but Bellcore's method also requires a sophisticated voice frequency narrow band level measurement capability to measure power levels on the fault locate pair.

D. Loopback-based T1 maintenance systems.

From the foregoing, it can be seen that it is desirable to perform maintenance testing on a T1 transmission line by access directly to the T1 line. Such testing can be accomplished using loopback technology.

Loopback technology has been used on T1 lines for quite some time as schematically illustrated in FIG. 4. The basic principle is that a T1 test unit 50 in a central office 51 sends a particular code (known as a loopup code) out to a loopback device 52 at a location 53, such as a customer premises as shown in FIG. 4. In response to the loopup code, the loopback device loops the circuit back on itself so that the test unit can send a signal out on the T1 line and measure that signal as it comes back. Separate metallic pairs for the east and west transmission directions make the loopback possible. Later, when the circuit is to be restored to its normal condition, the loopback is dropped by sending a loopdown code. Only one loopback can exist at each end of the line using this method because two or more consecutive loopback devices would not be separately addressed. One loopback is installed at the end of the T1 line 54 so that the test unit 50 only addresses one loopback. Note that the repeaters are on the same line that the loopback instructions are sent on, but that no one before has ever offered a repeater that can follow these sort of loopback instructions.

These loopback systems use an instruction set to command the loopback device. The commands are sent over the T1 line that is being tested by a test unit that has intrusive access to the line.

The existing in-band T1 loopback instruction set consists of two commands, Loopup and Loopdown, and has no addressing capabilities (See, Section 4.4.4 of Bellcore Technical Advisory, T4-TSY-000055). Furthermore, this in-band Loopback technology has never been applied to a sequence of repeaters and other components along a T1 transmission network which are accessible from a single test unit.

E. Other digital transmission loopbacks.

Various loopback methods for digital transmission exist. Repeater loopbacks described in U.S. Pat. Nos. 4,686,668; 4,319,080; 4,630,268; and 4,402,075, are examples. All of these examples are out-of-band techniques. Out-of-band methods are inferior because they will not work when transmitted through certain transmission devices.

F. DDS Loopback Systems

An alternative lower capacity standard communication system is referred to as DDS. In DDS, transmission lines between customer terminals may have up to 2 repeaters. The DDS technology allows for looping back repeaters along the line.

The DDS system has a network control bit that customers cannot modify. The network maintenance functions are enabled or disabled by that control bit. Therefore, the control signals for loopback in the DDS network are out-of-band signals that are only available to the network provider, or which reside in the overhead portion of the signal transmitted on the line.

The out-of-band control systems, such as the DDS, are inferior in performance to in-band control systems like the T1 network.

There are many kinds of network elements used in DDS, each with different functions. For a detailed description of how DDs works, refer to:

Snow et al. "Digital Data System: System Overview", The Bell System Technical Journal, volume 54, number 5, May-June 1975, pages 811-832.

TA-TSY-000077, "Digital Channel Banks, Requirements for Dataport Channel Unit Functions", issue 3, April 1986, Bell Communications Research.

TA-TSY-000055, "Basic Testing Functions for digital Networks and Services", issue 3, April 1987, Bell Communications Research.

There are a variety of loopbacks used within DDS. There are two basic types of loopback, interleaved and latching. Interleaved loopbacks are controlled by interleaving bytes of loopback in command with bytes of test data. The loopback drops as soon as the interleaved loopback command is discontinued. Latching loopbacks differ in that once the network element is looped back, loopback command bytes do not need to be interleaved with the test bytes in order to keep the element looped up.

The HL-96NY and 56 Kbps repeater interleaved loopbacks are representative of interleaved loopbacks in DDS. Interleaving adds complexity to the test unit that performs the loopback control and prevent effective pattern variation testing. Examples of useful pattern tests that cannot be effectively used in these prior art systems include ones density testing for repeaters with marginal clock recovery, and alternating 10101 testing to find T1 lin3es with bridge taps. These DDS loopbacks use a 3-state method. The first state is the Loopup state and is entered in response to loopup command received when in the third state. The second state is the loopdown state where the unit is inhibited from reacting to loopup commands and is entered from the first state. The third state is the loopdown state where the unit is not inhibited from reacting to loopup commands and is entered from the second state.

The other class of DDs loopbacks of interest is the latching loopbacks. The DDS latching loopback uses an unusual 6-state scheme for each element. In the first state, the loopdown state, the element is looped down. In the second state, the device recognition state entered from the first state, the element receives a device code that allows the element to determine whether or not to pay attention to further codes. The device code is not a specific address, because many elements of the same device type can all react to the same device code. The third state, the loopup pending state A entered from the second state, is entered in response to receiving more than 30 Loop Back Enable code bytes. In this state, the element cuts off the downstream elements from the incoming signal. The fourth state, the loopup pending state B entered from the third state, is entered when the remaining one second of Loop Back Enable bytes are received. In this state, the element is enabled to receive the next code. In the fifth state, the loopup state entered from the loopup pending state B, the unit is looped up in response to receiving Far End Voice code bytes. In the sixth state, the loopdown with loopup disabled state entered from the fifth state, the element is looped down with any further loopups disabled. The element enters this state in response to receiving all ones code bytes. The element returns to the loopdown state from this or any state in response to receiving Transition in Progress code bytes. This loopback method suffers several disadvantages. For example, to do 5 consecutive loopbacks using this DDs method it takes 50 separate test signals from the test set. The device-type signaling step further reduces the effectiveness of this DDS latching loopback.

SUMMARY OF THE INVENTION

The present invention provides a fault-location operating system for use with transmission networks that overcomes many of the problems with the prior art. According to one aspect, the present invention is an apparatus for transmitting data from a first terminal to a second terminal. A plurality of bidirectional T1 transmission links $L_i$, for $i=1$ through N, are used for transmission of data between the terminals. A test control unit is connected at the first terminal to the first end of the first transmission link $L_1$, and controls transmission of control signals across the first transmission link $L_1$. A plurality of repeaters $R_i$, for $i=1$ through $N-1$, are used for interconnecting the plurality of bidirectional links. Each repeater $R_i$ is connected to the first end of one transmission link $L_i$ and to the second end of another transmission link $L_{i+1}$. Each repeater includes a circuit for repeating data transmitted from the one transmission link $L_i$ for transmission on the other transmission link $L_{i+1}$, and a second circuit for repeating data transmitted from the other transmission link $L_{i+1}$ for transmission on the one transmission link $L_i$. In addition, a loopback circuit is included in each repeater that is responsive to the control signals on the one transmission link $L_i$ for looping back data transmitted from the one transmission link $L_i$ for transmission back on the one transmission link $L_i$. In this system, each repeater has a loopback capability responsive to control signals sent in-band through the transmission links. The loopback capability can be provided at other elements in the network so that a single test control unit can be used to locate faults anywhere within the network.

According to another aspect, the remote test control unit is coupled by a communication link to a test center according to a prespecified protocol. The test control unit is responsive to the prespecified protocol for generating prespecified control signals to enable and then disable the loopback circuit in determinate repeaters or other elements through the transmission system. In this manner, the remote test center is available for use by an operator of the system to perform testing sequences across numerous transmission lines in the network, from a single location.

According to yet another aspect, the present invention is an apparatus coupling a first bidirectional transmission link to a second bidirectional transmission link comprising a repeater control unit connected to the first bidirectional transmission link. The repeater control circuit is responsive to first, second and third prespecified signals on the first bidirectional transmission link for setting a first state, second state, third state, and a fourth state. A unit for repeating signals transmitted from the first bidirectional link for transmission on the second bidirectional link is operable during the first and fourth states. A unit for repeating signals transmitted from the second bidirectional link for transmission on the first bidirectional link is operable during the first state and the fourth state. A unit for looping back signals transmitted from the first bidirectional transmission link for transmission back on the first bidirectional transmission link is operable during the third state. During the second state and the third state, a unit generates and transmits the first prespecified signal on the second bidirectional link.

By controlling the state of the apparatus by a sequence of the first, second and third prespecified control signals, an operator at a remote test center is able to enable the loopback circuit in a determinate repeater, perform testing sequences on the determinate repeater, and then disable the loopback circuit. By repeating the sequence of prespecified control signals, a loopback circuit in a successive repeater along the transmission line is enabled. The operator is able to successively enable then disable determinate repeaters along the transmission line for fault location.

Other aspects and advantages of the present invention can be determined by review of the drawings, the detailed description, and the claims which follow.

BRIEF DESCRIPTION OF THE FIGURES

FIG. 1 is a schematic diagram of a system implementing the Fault-Locate Filter Method of the prior art.

FIG. 2 is a schematic diagram of a system implementing the CD-94-RPM fault location method of the prior art.

FIG. 3 is a schematic diagram of the Bellcore proposal for fault locate systems of the prior art.

FIG. 4 is a schematic diagram of a system with loopback capability of the prior art.

FIG. 5 is a schematic diagram of the fault location operating system of the present invention.

FIG. 6 is a flow chart illustrating the automatic test procedure implemented by the remote test unit for enabling the loopback circuit in a specific repeater.

FIG. 7 is a flow chart for enabling the loopback circuitry in a successive repeater.

FIG. 8 (is a flow chart for disabling the loopback circuitry in a determinate repeater.

FIG. 9 is a flow chart for automatic repeater testing procedure according to the present invention.

FIGS. 10A-10E, together, make up a schematic diagram of the repeater circuit according to the present invention.

FIGS. 11A-11B, together, are a flow chart illustrating the control flow for the repeater of FIGS. 10A-10E.

FIGS. 12A-12H are repeater loopback state diagrams according to the present invention.

FIGS. 13A-13C, together, make up a block diagram of the repeater controller integrated circuit according to the present invention.

FIG. 14 is a schematic diagram illustrating the need for an internally generated clock in the repeater logic.

FIGS. 15A-15C are diagrams showing the dimensions of the repeater housing according to the present invention.

FIG. 16 is a block diagram of an alternative repeater architecture.

FIG. 17 is a block diagram of another alternative repeater architecture.

DETAILED DESCRIPTION

A detailed description of preferred embodiments of the present invention is described with reference to the figures.

1. System Overview

The present invention provides a T1 Fault Location Operating System with Smarts "T-FLOSS" consisting of an overall system algorithm, language, and innovative repeater design. The algorithms and language span several different physical pieces within the system to provide coordinated fault location ability. The T-FLOSS consists of several parts as shown in FIG. 5.

FIG. 5 is a schematic diagram of the fault location operating system according to the present invention. The system comprises a remote test and access unit 100 coupled across line 101 to a digital cross-connect frame (DSX) 102 at a central office 103. The DSX 102 is coupled across a T1 line through a plurality of repeaters to a customer premises 104 or other terminal. The T1 line includes a plurality of bidirectional links $L_i$ for $i=1$ through N. A plurality of repeaters $R_i$, for $i=1$ through $N-1$, is included for interconnecting the plurality of bidirectional links $L_i$. Each repeater $R_i$ includes a repeater control circuit described in detail below.

The remote test and access unit 100 includes a means for communicating across line 105 to a test controller 106 at a test center 107. Alternatively, the remote test and access unit 100 could provide a user interface accessible by an operator at the central office.

In operation, system commands are passed over link 105 from the test controller 106 to a remote test and access unit 100. Automatic test procedures are invoked by a system level command received from the test controller at the remote test and access unit. The procedures are characterized by prespecified repeater commands coupled to the T1 line across line 101 through DSX 102. The repeater commands are passed in-band over the bidirectional link $L_1$ to the first repeater $R_1$. The repeater control system responds to the repeater commands for establishing a loopback condition as described in detail below.

Upon establishment of the loopback condition, test procedures may be carried out with a determinate repeater. The repeater commands may then be invoked to loopback a successive repeater along the transmission line. This process may proceed through all repeaters, or other loopback equipped units, on the transmission line until the faulty repeater is located, or the transmission line is given a clean bill of health.

1.1 System Instruction Set

The test capability is controlled from a test center 107 by a person or maintenance controller that wants to sectionalize a circuit fault. A specific system command protocol allows the test controller 106 to direct a remote test unit 100 to conduct a fault location test. The remote test 100 unit reports the results so that the test operator knows which repeater $R_i$ needs replacement. See Appendix 1 for a description of this system command protocol.

1.2 Repeater Instruction Set

The Remote Test Unit 100 directs the Repeater $R_i$ through various actions including test initialization, loopup, and loopdown modes.

| Repeater Commands Copyright Wiltron 1988 | |
|---|---|
| Test Initialization | 0101 00100 |
| Loopup | 0011 01110 |
| Loopdown | 1100 01110 |

The repeater commands set forth in the above table are different from any other T1 commands used in the network today. Some 5- and 3-bit T1 network commands are currently in existence, and most customer traffic that flows on the T1 network is arranged in 8-bit words. Hence the choice of a 9-bit instruction set assures uniqueness.

1.3 Automatic Test Procedures

In order for the fault location system to be useful, it must act rapidly, much more rapidly than a human operator could react. Speed is necessary to improve tester productivity and to provide a simple fault location capability that only disrupts the T1 dedicated services for a matter of seconds. Thus, in FIG. 5, the Remote Test Unit 100 carries out Automatic Test procedures at the direction of the Test Controller 106. In this fashion, a single System Command from the Test Controller 106 is translated into many quickly-performed Repeater Commands.

FIGS. 6, 7, 8, and 9 illustrate testing procedures carried out by the test controller 106 in response to system commands.

FIG. 6 is the algorithm carried out at the remote test unit (RTU) in response to a system command requesting loopback of a specific repeater. Upon receipt of the command, the algorithm starts (block 200).

The controller sets a repeater counter to zero and sends the test initialization pattern for five seconds (block 201). After five seconds, the test controller sends a loopup pattern, enables a pattern receiver for detection of the loopup pattern, and starts a five second timeout timer (block 202). Next, the algorithm determines whether timeout has occurred (block 203). If timeout has occurred, then the algorithm reports the repeater count number to the test controller 106 (block 204) and the algorithm ends (block 205). If in block 203, the timeout has not occurred, the remote test unit 100 determines whether the loopup pattern is being received by the pattern receiver (block 206). If the pattern is not being received, then the repeater has not yet been looped back and the algorithm returns to the timeout test of block 203. If the loopup pattern is being received, then the repeater is looping back the signal. The repeater counter is then incremented by one (block 207) to show how many repeaters have been looped back. The repeater counter number is compared with the repeater number specified in the system command (block 208). If the repeater number does not match, then the remote test unit sends the loopdown pattern, sets a timeout timer to five seconds, and enables the pattern receiver to detect the loopdown pattern (block 209). Next, the algorithm tests whether the timeout has occurred (block 210). If not, then the algorithm checks if the loopdown pattern has been lost at the receiver (block 211). If it has, then the repeater has been successfully looped down and is in a normal through-transmission state. If the loopdown pattern continues to be received, then the repeater is still looped back and the algorithm returns to the timeout test of block 210. When the loopdown pattern is finally lost, then the algorithm returns to block 202 to enable the loopback of a successive repeater. If at block 208, the requested repeater is identified, then the repeater counter count number is reported to the system test controller 106 at block 204 and the algorithm ends (block 205).

If at block 210, a timeout occurs, then the repeater count is reported (block 204) and the algorithm ends (block 205).

Once the determinate repeater has been looped back by following the algorithm of FIG. 6, the remote test unit 100 may perform bit error tests or other operations on the determinate repeater. After performing any test operations desired, the remote test center may wish to enable the loopback circuitry in a successive repeater or restore the repeaters in the link to the loopdown mode, as shown in FIGS. 7 and 8, respectively.

In FIG. 7, the loopback circuitry in a successive repeater is enabled. The algorithm starts at block 300. The remote test unit sends the loopup pattern, enables the pattern receiver to detect the loopup pattern, and starts a five second timeout timer (block 301). Next, the algorithm determines whether the timeout has occurred (block 302). If the timeout has occurred, the remote test unit reports that the attempt failed to the test center 106 (block 303) and the algorithm ends (block 304). If the timeout has not occurred, then the remote test unit determines whether the loopup pattern is being received (block 305). If the loopup pattern is not being received, then the algorithm returns to the timeout test of block 302. If the loopup pattern is being received, then the remote test unit reports that the attempt has been completed to the test center 106 (block 306), and the algorithm ends (block 304).

In FIG. 8, the remote test unit drops the loopback at one of the repeaters in the line. The algorithm starts at block 350. First, the remote test unit sends the loopdown pattern, sets a five second timeout timer, and enables the pattern receiver to detect the transmit pattern (block 351). Next, the algorithm determines whether the timeout has occurred (block 352). If the timeout has occurred, then a report is sent to the test center 106 indicating failure (block 353), and the algorithm ends (block 354). If the timeout at block 352 has not occurred, then the algorithm determines whether the loopdown pattern is lost, indicating that the loopback circuitry has been disabled (block 355). If the pattern has not been lost, then the algorithm returns to block 352. If the pattern has been lost, then the remote test unit 100 reports that the attempt has been completed to the test center 106 (block 356), and the algorithm ends (block 354).

A more generalized algorithm for performing a health check and, optionally, stress test on all repeaters in a transmission line is illustrated in FIG. 9. The algorithm begins in response to the test command from the test center 106 (block 400). First, the repeater counter is set to zero, and the test initialization pattern is sent for five seconds (block 401). Next, the loopup pattern is sent, the pattern receiver is enabled to detect the loopup pattern, and the timeout timer is set to five seconds (block 402). Next, the algorithm determines whether the timeout has occurred (block 403). If the timeout does occur at block 403, then the algorithm reports the repeater counter count to the test center 106 (block 404), and the algorithm ends (block 405). If the timeout has not occurred at block 403, then the remote test unit determines whether the loopup pattern has been received (block 406). If not, then the algorithm returns to block 403. If the loopup pattern is being received, then a stress test is started if requested by the system command (block 407). If the stress test is not requested or after completion of the test, the algorithm sends the loopdown pattern, sets the timeout timer to five seconds, and enables the receiver pattern to detect loopdown pattern (block 408). Next, the algorithm determines whether the timeout has occurred (block 409). If it has occurred, then the repeater counter count is reported to the test center 106 (block 404), and the algorithm ends (block 405). If the timeout has not occurred at block 409, then the algorithm determines whether the loopdown pattern has been lost (block 410). If it has not been lost, then the algorithm returns to block 409. If the pattern has been lost, then the repeater counter is incremented by one (block 411), and the algorithm returns to block 402. In this manner, every repeater along a transmission line is loop ®d back in succession. A faulty repeater will be detected by repeater counter count number smaller than the total number of repeaters along the line. Also, the results of any stress test on a determinate repeater can be reported to the test center.

2.0 Repeater

The Repeater has an intelligent loopback capability that allows the Remote Test Unit to loop back the T1 line and conduct sophisticated measurements. It interprets the Repeater Commands and acts appropriately. It has several safeguards built into its logic that ensure reliable operation and minimize the chance of unintended loopback operation.

FIGS. 10A-10E illustrate the circuit schematic for the repeater according to the present invention. The repeater receives data transmitted in one direction from a first bidirectional link, regenerates or amplifies the data, and retransmits it on a second bidirectional link. Likewise, the repeater receives data transmitted in the other direction from a second bidirectional link, regenerates or amplifies the data, and retransmits it on the first bidirectional link. As shown in FIG. 10D, the output channel of the first bidirectional link is connected to a pair 1 input line 500 and the input channel of the first bidirectional link is connected to a pair 2 output line 501. The input channel of the second bidirectional link is connected to a pair 1 output line 502 and the output channel is connected to a pair 2 input line 503. Data received from the first bidirectional link across the pair 1 input line 500 is retransmitted on the second bidirectional link on the pair 1 output line 502. Likewise, information received on the pair 2 input line from the second bidirectional link is retransmitted on the pair 2 output line 501 into first bidirectional link. Other external connections to the repeater include the ground input 504, a first fault output 505, and a second fault output 506.

The pair 1 input 500 includes a first line 507 which is coupled through resistor 508 and across line 509 to a first end of transformer coil 510. Second line 511 of pair 1 500 is coupled through resistor 512 across line 513 to the second end of transformer coil 510. A varistor 514 is coupled between lines 513 and 509. The combination of resistor 508, varistor 514, and resistor 512 provide voltage surge protection, and lightning protection.

Pair 1 output pair 502 includes a first line 515 and a second line 516. Line 515 is coupled through resistor 517 across line 518 to a first end of transformer coil 519. Line 516 is coupled through resistor 520 across line 521 to the second end of transformer coil 519. Varistor 522 is coupled between lines 521 and 518.

Pair 2 input 503 includes a first line 523 and a second line 524. Line 523 is coupled through resistor 525 across line 526 to a first end of transformer coil 527. Line 524 is coupled through resistor 528 across line 529 to a second end of transformer coil 527. Varistor 530 is coupled between lines 529 and 526.

The pair 2 output 501 includes a first line 53 and a second line 532. Line 531 is coupled through resistor 533 across line 534 to a first end of transformer coil 535. Line 532 is coupled through resistor 536 across line 537 to a second end of transformer coil 535. Varistor 538 is coupled between lines 534 and 537.

Transformer coil 510 includes a center tap line 539 from which power may be derived for the repeater. Line 539 is coupled to the cathode 540 of Zener diode 541. The anode of Zener diode 541 is coupled to a ground terminal 542. Likewise, the cathode 540 is coupled across capacitor 543 to the ground terminal 542. The power supply tap 544 with a 5 volt value is taken from the cathode 540 and distributed through the repeater. All of the terminals marked +5 volts in FIGS. 10A-10E derive their power from this terminal 544.

Likewise, transformer coil 527 includes a center tap line 545 which is coupled through power selector switch 546 to line 547 which is coupled to the center tap point of transformer coil 519. Transformer coil 535 includes center tap line 548 which is coupled through power selector switch 546 to the ground terminal 542. The power selector 546 can switch the connections of the center tap coils.

A second transformer coil 550 is coupled with transformer coil 519. The first end of transformer coil 550 is connected to the ground line 504. The second end is connected across line 551 through inductor 55, and across line 553 through resistor 554 to line 555. Line 555 is coupled through a fault line selector switch 556 to fault output 505 or fault output 506. In the embodiment shown, the switch 556 is set so that fault output 505 is connected with transformer coil 550. The switch 556 may be set to couple transformer coil 557 as illustrated.

The transformer coil 557 is coupled with transformer coil 535 at pair 2 output line. The first end of transformer coil 557 is connected to line 558 which is coupled to a casing ground 559 of the repeater housing. Likewise, the casing ground 559 is coupled across line 560 to capacitor 561, which is coupled to terminal 542. In addition, the ground input 504 is coupled to line 560. The second end of coil 557 is connected to line 680, through inductor 677, line 678, through resistor 679, to line 506.

The circuitry illustrated provides an interface to the first and second links and power to the repeater. Also, fault outputs provide connection for the fault line within the repeater housing. All the repeaters in a repeater housing share a common Fault Line Filter.

The incoming and outgoing signals are coupled into the regenerative repeater and the SMART Controller through transformer coils 565, 566, 567, and 568. Transformer coil 565 is coupled to transformer coil 510 for coupling a signal on the pair 1 input 500 to lines 569 and 570. Lines 569 and 570 are coupled to relay pair 571 (See FIG. 10C). Relay pair 571 is normally set to transmit the signals on lines 569 and 570 to the input lines 572 and 573 for the low power repeater for pair 1 574 (See FIG. 10B). A termination resistor 575 is coupled between lines 569 and 570 to provide a terminated input for the input line of the bidirectional pair.

Similarly, the transformer coil 567 is coupled with transformer coil 527 for supplying signals supplied on the pair 2 input 503 to lines 576 and 577. Lines 576 and 577 are supplied to relay pair 578 and coupled by termination resistor 579. Relay pair 578 is normally connected to supply the signals on lines 576 and 577 to the input lines 579 and 580 of the low power repeater for pair 2 581.

Low power repeater for pair 1 574 regenerates the signals received at its input and supplies them on output lines 582 and 583. The output lines 582 and 583 are supplied through current limiting resistors 584 and 585, respectively, and across lines 586 and 587 to the inputs of relay pair 588. Relay pair 588 is normally connected to supply the signals on lines 586 and 587 to lines 675 and 676, which are connected to transformer coil 566 whereby the signal is coupled to the pair 1 output lines 502.

Low power repeater for pair 2 581 regenerates the signals received on lines 579 and 580 at its input and supplies the resultant signals on lines 589 and 590, respectively. The signal on line 589 is supplied through resistor 591 to line 592 which is connected as a first input to relay pair 593. Likewise, the signal on line 590 is connected through resistor 594 to line 595 which is connected as a second input to relay pair 593. Relay pair 593 is normally connected to supply the signals on lines 592 and 595 to lines 690 and 691, which are connected to transformer coil 568 through which the signals are coupled to the pair 2 output line 501.

The outputs of the low power repeater for pair 1 574 and the low power repeater for pair 2 581 ar also coupled to a controller 596 (FIG. 10A). In particular, the signals on lines 582 and 583 are coupled to inputs RDATA1+ and RDATA1− of controller 596. Signals on lines 589 and 590 are coupled to inputs RDATA2− and RDATA2+ of controller 596.

The low power repeater for pair 1 regenerates a clock from the signal and supplies that signal on line 597 to the input RCLK1 of controller 596. Likewise, line 597 is coupled through resistor 598 to the 5 volt power supply from terminal 544. Also, the clock recovered from the inputs to low power repeater for pair 2 581 is supplied on line 599 to the input RCLK2 of controller 596. Line 599 is coupled through resistor 600 to the 5 volt power supply from terminal 544.

Other inputs to the controller 596 include RESET which is oonneoted to a power up reset RC timing network 601. Also, a relay driving RC timing network 602 is coupled to inputs RIN and RCIN. An internal clock timing crystal 603 is coupled to inputs XTAL1 and XTAL2. The power supply of 5 volts from terminal 544 is coupled to the VCC inputs, and ground inputs are coupled to the ground inputs from terminal 542. The controller 596 generates outputs SINIT1, RESET1, SLOOP1, SLOOP2, RESET2, and SINIT2. These signals are supplied to relay coil and driving circuit shown in FIG. 10E.

Also, the controller generates the outputs TCLK, TDATA+, and TDATA− on lines 604. Lines 604 are coupled to an input of test initialization code driver 605 (FIG. 10B). The output of the test initialization code driver is supplied on lines 606 and 607 through resistors 608 and 609, respectively. Resistors 608 and 609 are coupled to lines 610 and 611, respectively. Lines 610 and 611 are coupled as inputs to relay pair 588 and to relay pair 593. Relay pairs 588 and 593 are normally open to lines 610 and 611. However, when closed, signals supplied on lines 610 and 611 from the initialization code driver 605 are coupled to the pair 1 output lines 502 from relay pair 588, and to pair 2 output lines 501 from relay pair 593.

The SMART Repeater Schematic (FIGS. 10A-E) is described below.

Loopback circuits are provided for connecting the output of low power repeater for pair 2 581 to the input of low power repeater to pair 1 574, and for connecting the output of low power repeater for pair 1 574 to the input of low power repeater pair 2. The first loop circuit includes the transformer 612 which is coupled to lines 586 and 587. The output of transformer 612 is supplied on lines 613 and 614. Line 613 is coupled through resistor 615 to line 616. Line 614 is coupled through resistor 617 to line 618. Lines 616 and 618 are coupled by resistor 619. The transformer 612 and resistors 615, 617, 619 provide for attenuation of the signal on lines 586 and 587. The attenuated signal is supplied on lines 616 and 618 to the relay pair 578. Relay pair 578 is normally open with respect to lines 616 and 618. But when closed, the signal on lines 616 and 618 is supplied on lines 597 and 580 to the input of low power repeater for pair 2 581.

The second loop circuit includes transformer 919. The inputs to transformer 919 are supplied from the output of the low power repeater for pair 2 on lines 592 and 595. The output of transformer 919 is supplied on lines 620 and 621. Line 620 is coupled through resistor 622 to line 623. Line 621 is coupled through resistor 624 to line 625. Lines 623 and 625 are coupled by resistor 626. This combination provides attenuation of the signal supplied on lines 592 and 595. The attenuated signal on lines 623 and 625 is supplied through relay pair 571. Relay pair 571 is normally open to the signals on lines 623 and 625, but when closed, supplies the signals on lines 623 and 625 to the inputs of low power repeater for pair 1 574.

Relay pairs 571, 588, 578, and 593, designated K1, K2, K3, and K4, respectively, are controlled by the relay coil driving circuit of FIG. 10E. The relay coil and driving circuit is controlled by the signals SLOOP2, RESET2, SINIT2, SINIT1, RESET1, and SLOOP1 generated by the controller 596. These control signals are supplied to a relay driver IC 630. The output of relay driver IC 630 includes DR1 through DR8 on lines 631. The control signals DR1 through DR8 are coupled to the relay pairs K1 through K3. Relay pair K1 is designated by set coil 632 and reset coil 633. Relay pair K4 is designated by set coil 634 and reset coil 635. Relay pair K2 is designated by set coil 636 and reset coil 637. Relay pair K3 is designated by set coil 638 and reset coil 639. The control signals DR1 and DR2 are supplied to drive coils 632 and 633 of pair K1, respectively. Control signals DR2 and DR3 are supplied to coils 634 and 635 of pair K4, respectively. Control signals DR5 and DR6 are supplied to coils 636 and 637 of pair K2, respectively. Control signals DR7 and DR8 are supplied to coils 638 and 639 of pair K3, respectively. The second ends of coils 632 through 639 are coupled to line 640. Line 640 is coupled to a relay driving power sourcing capacitor 641 which is coupled to ground. Likewise, line 640 is coupled through current limiting resistor 642 to the 5 volt power supply.

The relays used in relay pairs K1 through K4 are mechanical latching relays. To change relay state, the relay coil needs only be charged for about 15 milliseconds.

In the normal state, the repeater receives signals on the input of pair 1 and retransmits them on the output of pair 1, and receives signals on the input of pair 2 and retransmits them on the output of pair 2. The input of pair 1 and the output of pair 2 are connected to the first bidirectional link, and the output of pair 1 and the input of pair 2 are connected to the second bidirectional link. The controller provides a power up reset, loop control originating from the pair 1 input 500, and loop control originating from the pair 2 input 503.

During power up reset, the control signals RESET1 and RESET2 are activated for 20 milliseconds to reset all relays to the normal positions. When this occurs, the K1, K2, K3, and K4 reset relay coils 633, 635, 637, 639 are charged.

During loop control originating from the pair 1 input 500, the SINIT1 signal is activated for 20 milliseconds to charge the set relay coil 636 for K2. This blocks the normal output from the low power repeater from pair 1 574, and replaces it with the control signals supplied from the test initialization code driver 605 on the pair 1 output 502.

Later, the control signal SLOOP1 is activated for 20 milliseconds to charge the set relay coil 638 for K3. Accessing relay K3 blocks the normal output from pair 2 input 503 and replaces it with the attenuated signal from the loop circuit from lines 616 and 618.

To reset the repeater to the normal state, the signal RESET1 is activated for 20 milliseconds, charging the reset relay coils 637, 639 for K2 and K3.

During a loopback originating from control signals from the pair 2 input 503, the sequence of operation is as described above for control from pair 1 except that the control signals SINIT2 drives the set relay coil 632 for K1 for transmitting the initiate code, and the access the loopback circuit. The control signal RESET2 is used for restoring the circuit to normal operation.

The controller 596 is responsive to prespecified Repeater Commands transmitted on the input lines and detected at the output of the low power repeaters 574 or 581. In response to those prespecified control signals, the relay control as mentioned above is carried out.

2.1 Repeater Control Logic

The Repeater has its own special intelligence within the Controller 596 that allows it to perform in concert with prespecified T-FLOSS control sequences. This intelligence is provided on a custom integrated circuit and controls the loopback operation.

FIGS. 11A–11B set out the repeater control flow chart implemented by the controller 596. The controller begins at power up (block 700). After power up, the controller resets to the Loopdown state (block 701). From the Loopdown state, the relays are in their normal positions, and the repeater operates normally. A controller in the Loopdown state samples the signals on RDATA1 and RDATA2 to determine whether the test initialization pattern is being received (block 702). If not, the controller sits in a loop waiting for that pattern. If the test initialization pattern is received, then the controller tests to determine whether the bit error rate (BER) is less than 1% for 1 second (block 703). If the error rate is too great, or the signal is not received for 1 second, then the algorithm returns to block 702, waiting for reinitiation of the test initialization pattern.

If the test initialization pattern is received for an entire second, then the control switches to the test initialization state, sets a timer for 60 seconds and waits to receive the loopup pattern (block 704). Next, the controller tests for timeout (block 705). Upon timeout, the controller resets to the Loopdown state at block 701. If timeout has not occurred, then controller looks for the loopup pattern (block 706). If the loopup pattern is not received, then the algorithm looks for the test initialization pattern (block 707). If the test initialization pattern is not being received, then the algorithm returns to the timeout check of block 705. If the test initialization pattern is being received at block 707, then the bit error rate is tested for one second. If the bit error rate is less than 1% for one second, then the algorithm returns to the test initialization state at block 704. If the bit error rate is greater than 1% for one second, then the algorithm loops back to the timeout test at block 705.

If at block 706, the loopup pattern is detected, then the bit error rate of that pattern is tested for 1 second (block 709). If the bit error rate is greater than 1%, then the algorithm returns to the timeout test at block 705.

If the loopup pattern is received for 1 second with a bit error rate of less than 1%, then the controller switches to the Loopback Pending state (block 710). In the Loopback Pending state, the test initialization pattern is forwarded to following repeaters, rather than the control signals coming from the test direction on the transmission line. Also, the timer is set to 60 seconds (block 710). The controller then determines whether timeout has occurred (block 711). If timeout has occurred, then it returns to the Loopdown state of block 701 and restores the transmission parts. If timeout has not occurred, then the controller tests for the test initialization pattern (block 712).

If the test initialization pattern is received, then the bit error rate is tested for 1 second (block 713). If it is received for 1 second with an error rate of less than 1%, then the algorithm returns to the test initialization state at block 704. If the test initialization pattern is not being received, then the controller looks for the loopup pattern (block 714). If it is not being received, then the controller returns to the timeout test at block 711. If the loopup pattern is being received, then the bit error rate is tested for 1 second (block 715). If the pattern does not meet the bit error rate requirements, or was received for less than 1 second, then the controller returns to the timeout test at block 711. If the pattern is received for 1 second, then the controller changes to the Loopup state (block 716). In the Loopup state, the loopback relays are activated, and the timer is set to 20 minutes. Next, pattern testing of the repeater circuit may be carried out, if initiated by the test controller (block 717). Next, and during the pattern testing, if any, the controller tests for timeout (block 718). If timeout occurs, then the controller resets to the Loopdown state at block 701. If timeout has not occurred, then the controller looks for the loopdown pattern (block 719). If the loopdown pattern is not received, then the controller returns to the timeout test at block 718. The pattern testing may continue during this loop. If the loopdown pattern is received, then the bit error rate of the pattern is tested for one second (block 720). If it is not received for 1 second, then the controller returns to the timeout test at block 718. If the loopdown pattern is received for one second, then the controller resets the relays to the Loopdown state at block 701.

Note that T1 frame bits will be detected as a bit error during these sequences. However, the 1% BER threshold prevents the frame bits from interfering with the sequence.

2.2 Repeater Loopback State Chart

The Repeater has several separate T1 connection states as defined by the Repeater Logic Flow Chart of FIGS. 11A-11B and the Repeater Loopback State Chart of FIGS. 12A-12H. The primary state is the Loopdown state, where the repeater transmits the T1 signal without disruption as illustrated in FIG. 12A. In the Loopdown state, the repeater cannot recognize a loopup command. The next state is the test initialization state shown in FIG. 12B. After receiving 1 second of test initialization command, the repeater is initialized so that it can recognize a loopup instruction. The third state is the Loopback Pending state shown in FIG. 12C. After the repeater has received one second of loopup instruction, it disconnects the outgoing line from the incoming line from which the control signals are received, and sends test initialization instruction on the outgoing line. The fourth condition is the Loopup state for a determinate repeater shown in FIG. 12D. After the 2nd complete second of loopup command is received while in the Loopback Pending state, the repeater executes the loopup. Only one repeater will enter Loopup state. Subsequent repeaters on the line will return to the test initialization state as shown in FIG. 12D.

Once the repeater is looped back, it will drop the loopback after it sees one second of loopdown instruction and return to the Loopdown state as shown in FIG. 12E. When the repeater changes from Loopup to Loopdown states, the loopdown code is passed down to following repeaters which remained in the test initialization state. The test initialization state is not changed by the loopdown code. A repeater in the Loopdown state will not respond to additional loopup commands.

In this manner, the loopup command is sent to the first repeater in the test initialization state. That repeater goes to Loopback Pending state as shown in FIG. 12F. Then, after 2 seconds of loopup command, the Loopback Pending repeater goes to the Loopup state as shown in FIG. 12G. Later, the loopdown command resets the repeater to the Loopdown state as shown in FIG. 12H. This algorithm allows several repeaters to respond one-at-a-time to loopup commands.

2.3 Timeouts

In order to make the loopback operation less hazardous to the network, several timeouts are incorporated into the repeater. These timeouts ensure that the repeater will automatically return to the Loopdown state should something abnormal happen. These timeouts move the repeater from each of the last three states to the Loopdown state if a certain amount of time passes with the next expected command not present. The values for the timeouts are: in test initialization, 60 seconds; in Loopback Pending, 60 seconds; in loopup, 20 minutes. The timeouts are found in the Logic Flow Chart of FIGS. 11A-11B.

2.4 Repeater Logic Block Diagram

The Repeater Logic Block Diagram is shown in FIGS. 13A-13C. The inputs to the controller were specified with reference to FIG. 10A. Inputs XTAL1 and XTAL2 are coupled to an internal reference clock generator 800. The reference clock generator generates an internal clock at 3.58 megaHertz on line 801.

The RESET signal is supplied to a reset control block 802. The reset control block 802 generates a reset signal on line 803.

The RIN and RCIN signals are supplied on lines 804 and 805 as inputs to state control and relay select circuitry 806 (FIG. 13C).

The RCLK1, RDATA1+, and RDATA1— signals are supplied to the pair 1 test initialization code detector 806. They are also coupled to contention circuitry 807 (FIG. 13B).

The RCLK2, RDATA2+, and RDATA2— signals are coupled as inputs to the pair 2 test initialization code detector 808 and as inputs to the contention circuitry 807.

The outputs SINIT1, RESET1, SLOOP1, SINIT2, RESET2, and SLOOP2 signals are generated by the state control and relay select circuitry 806. The outputs TDATA+ and TDATA— are generated by the test initialization code generator 809 (FIG. 13C). The output TCLK is supplied by the RCLK signal described below.

The test initialization code detector for pair 1 generates a start signal on line 810 and a pattern matched signal on line 811. The start signal is asserted upon receipt of a test initialization code. The pattern match signal on line 811 is asserted for each pattern received. The pattern count and the pattern match signals are supplied as an input to the pattern counter 812 which is reset by the start signal on line 810. The pattern counter 812 counts the number of pattern match signals. The start signal on line 810 is also coupled to a 1 second timer 813. The 1 second timer generates an enable signal on line 814 enabling the count threshold comparator 815 after 1 second from the receipt of the start signal on line 810. If the pattern counter 812 has a count which is greater than or equal to the count threshold, then the count threshold comparator 815 generates a valid signal on line 816. This count threshold comparator generates the bit error rate information referred to in the control flow chart of FIGS. 11A-11B.

The one second timer 813 is clocked by the internal clock on line 801.

The pair 2 test initialization code detector 808 generates a pattern match signal on line 817 and a start signal on line 818. The pattern match signal is supplied through pattern counter 819. The output of pattern counter 819 is compared in count threshold comparator 820 1 second after receipt of the start signal. The start signal is supplied to the 1 second timer 821 which generates the compare signal on line 822. The count threshold comparator 820 generates a valid signal on line 823 if the threshold is reached.

The 1 second timers 813 and 821 generate a timer state signal on lines 824 and 825, respectively, which are coupled to the test initialization code detectors 806 and 808. The timer state signal prevents assertion of the start signal while the counter is counting up.

Contention circuitry 807 blocks out assertion of the valid signal from the pair which is received second. The input which is selected by contention circuitry 807 is supplied through on the DATA—, DATA+, and RCLK signals at the output of contention circuitry 807. The contention circuitry also generates an initialization valid signal on line 826, a pair 1 active signal on line 827 if pair 1 is selected, a pair 2 active signal on line 828 if pair 2 is selected.

The contention circuitry 807 also receives a loop state signal on line 829 from the state control and relay select control circuitry 806.

The DATA—, DATA+, and RCLK signals are supplied to loopup and loopdown code detector 830. The loopup/loopdown code detector 830 generates a start signal on line 831 and a code detected signal on line 832. A pattern counter 833 counts the detected codes indicated across line 832. The start signal on line 831 initiates a 1 second timer 834 which supplies a compare signal on line 835 to the count threshold comparator 836. The count threshold comparator compares the output of the pattern counter 833 with a count threshold. If the threshold is met, then a valid signal is asserted on line 837. The 1 second timer 834 supplies a timer state signal on line 838 to the loopup/loopdown code detector 830.

The valid signal on line 837 is supplied to the state control and relay select circuitry 806. In addition, the valid signal on line 837 is supplied as a reset/start input to the stage timeout timer 838. The stage timeout timer 838 is connected to line 826 to receive the initialization valid signal on line 826, and to receive the loop state signal on line 829. The stage timeout timer 838 generates a timeout signal on line 839 which is supplied to the reset control block 802.

In operation, the test initialization code detector 808 or 806 searches for the test initialization code. Upon generation of the valid signal, the contention circuitry 807 asserts the initialization valid signal and indicates the active pair to the state control circuitry 806. The state control circuitry 806 enters the test initialization state and initializes the loopup/loopdown code detector 803 to search for the loopup code. The initialization valid signal on line 826 starts the stage timeout timer for a 1 minute timeout period.

When the loopup code is detected for a first second, a first valid signal is asserted on line 837, and the state control circuitry switches to the Loopback Pending state and the stage timeout timer is set for 60 seconds. When the loopup code is received for a second second, a second valid signal is asserted on line 837 and the state control circuitry enters the Loopup state.

When the state control circuitry changes to the Loopup state, the loop state signal on line 829 causes the stage timeout timer to enter a 20 minute timeout loop.

One of the distinguishing features of the Repeater Controller logic is that it uses a single state machine. A single state-machine is shared by the loopbacks for both directions. This sharing simplifies state logic and substantially reduces the likelihood of logical flaws that could be encountered with two linked state-machines. The two linked state-machine approach is a feasible alternative. But, only a single state machine is required because it is only possible to loop back a single direction at a time.

2.5 Contention Resolution

There needs to be a method of sharing the single state-machine between both directions. At times there is a likelihood that both directions will simultaneously try to use the state-machine with potential disruptions. A simple contention resolution scheme minimizes this likelihood of disruption. Two separate test initialization counters 815, 820, one for each direction, determine whether one second of test initialization signal has been successfully received. If it has, then the repeater is initialized in one direction to begin testing and the other direction is locked out. Both directions can receive test initialization signal at the same time, and as long as one of them finishes at least 0.3 microseconds ahead of the other, then the first one to complete a full second will gain control of the state-machine. If less than 0.3 microseconds separates the finish, then each side is locked out for a few microseconds, after which each of the two counters can begin looking for test initialization signal again. After one side has successfully gained use of the state-machine, the other side remains locked out until the first side returns to the Loopdown state.

2.6 Bidirectional loopback

The bidirectional loopback shown in FIGS. 10A-10E in the loop back network prevents a potentially horrendous implementation problem for the repeater. There are 22,320 potential ways to wire up a single repeater, 16 of which will actually work, and only 1 of which is standard. T-FLOSS only needs a loopback in one direction in order to work, but in order to make sure that nonstandard wiring will not cause problems, the bidirectional loopback is incorporated. This loopback works with all 16 possible wiring combinations that will allow the repeater to work.

2.7 Balanced Terminations

The loop back network has balanced terminations in all loopback configurations. Maintaining the balance on all T1 terminations during all phases of the loopback is difficult. Introduction of a balance circuit to satisfy one loopback state may degrade the quality of a different termination during a different state.

2.8 Loopback attenuation

Attenuation is (see 622, 626, 624) inserted in the loopback path between regenerators in order to simulate a typical line loss that the repeater would need to withstand.

2.9 Smart Controller Circuit

The principal component of the Smart Controller Circuit illustrated in FIGS. 10A-10E is a custom integrated circuit illustrated in 10A, 11A-B, and 13A-C. The SMART Controller circuit also has additional unique features besides the custom integrated circuit logic.

2.9.1 Internally generated clock

As shown in FIG. 14, with a bidirectional loopback it is conceivable that two different repeaters could accidentally loopback a signal toward each other. The logic on the repeater requires a clock in order to function, yet, as shown in FIG. 14, the logic in repeaters 2 and 3 is cut off from the outside T1 line signal which could provide the clock. Therefore, an internally generated clock is desirable on the repeater itself to provide the clock regardless of the state of loopbacks on the T1 line. The internally generated clock drives the timeout logic to return repeaters 2 and 3 to a normal Loopdown state.

2.9.2 Fast Internal Clock rate

Because a different clock is used for the one second timers than the T1 signal itself, it is desirable to have a clock rate that is at least double the nominal rate of the T1 line. This ensures that all the regenerated pulses of the T1 line and repeater chip clock signal (FIG. 10B, 597, 599) will be accurately recorded by the repeater logic.

2.9.3 Custom Integrated Circuit Pin Connections

The Custom Integrated Circuit implemented in the Smart Controller has a unique set of electrical connections that drive the Loopback Network, and the Relay Coil and Driving Circuit.

2.10 Relay Coil and Driving Circuit

Repeaters are limited to 60 mA current at all times. Yet the operation of relays requires a surge of power. For this reason, a charging capacitor 641 is used to provide the relays with sufficient power without drawing excessive current. The Relay Coil and Driving Circuit is illustrated in FIG. 10E.

2.11 Repeater Housing

FIGS. 15A-15C are outline drawings of the repeater housing. As can be seen, the repeater housing is no larger than 2.5 inches by 0.7 inches by 5.9 inches. The repeater housing encases all of the logic of the repeater and includes a connector for coupling to the bidirectional links. The size constraints of the repeater housings are critical because the installed base of T1 transmission lines make it difficult to install larger repeaters. The repeater, according to the present invention, provides much greater functionality in a box of the size illustrated in FIGS 15A-15C than is contemplated by prior art systems.

3.0 Advantages of The Invention

The Invention is expected to be a strong contributor to the industry for several reasons.

3.1 It is fully integrated with CMTS, a premier centralized test system including a Test Controller. This integration means that the telephone company can improve productivity by redeploying its workforce from the many central offices to just a few centralized test centers. The telephone company can also use the same personnel that already do related T1 testing through CMTS to do repeater fault location on the same T1 lines.

3.2 It doesn't require fault location pairs like every other repeater fault locating alternative does. Many large telephone companies have at least a few regions where the fault locate pairs are not commonly available, and the telephone companies would like to have just one overall repeater fault locate system. T-FLOSS can be used anywhere the telephone company has T1 lines, regardless of the condition of the fault locate pairs.

3.3 It makes possible a wide range of direct bit error measurements on the T1 line instead of the difficult-to-interpret audio power measurement of the Fault-Locate Filter system or the limited and not-always-available BPV measurements of the CD-94. The full capability of the Remote Test Unit can be used to determine which repeater needs replacement. Marginal repeaters can have an extensive battery of tests performed on them to accurately identify which repeater needs replacement. Useful bit error tests that can be used include BPV, QRS, and ones density tests.

3.4 The Repeater is plug-compatible with the standard repeater already used in the market, so everyone can use the Repeater in their networks. Because it is plug-compatible, the Repeater supports two fault location systems simultaneously—the T-FLOSS and the old Fault-Locate Filter system. This capability is useful during a transition period when Repeaters are installed but the T-FLOSS is not yet in use. Plug compatibility also means that the installers do not need extra training to put the repeaters in. They set the normal options and plug it in, just like a standard repeater.

3.5 The T-FLOSS doesn't require an address to be set on the repeater to distinguish it from other repeaters on the line. Instead, the T-FLOSS uses its algorithm to count how many repeaters have already been looped back to determine which repeater is presently looped back. With no address to be set, the installer and telephone company has one less operation to do, and there is one less mistake to be made.

3.6 The invention helps telephone companies combine maintenance operations because the same Remote Test Equipment and Test Controller used to control the Repeater also can be used to conduct other existing T1 maintenance functions and loopback tests.

3.7 Finally, unlike the CD-94, no extra splicing is needed at the remote Repeater Housing to install the Repeater.

4.0 Alternative Implementations of the Invention

4.1 Clock Speed

Although a fast clock of twice the nominal line rate is desirable for the internally generated clock, other speeds are possible. Speeds that equal or are less than the line rate will cause varying amounts of inaccuracy, which in most cases is tolerable if not desirable. A clock rate significantly faster than twice the line rate is also possible, but is not needed for the described application.

4.2 Unidirectional Loopback

Although we believe the bidirectional loopback to be the best implementation, it is possible to apply the same principles to a unidirectional loopback. The unidirectional loopback imposes the condition that all repeater housings be wired uniformly, and prevents loopbacks from being performed from the customer premises direction.

4.3 A Separate State Machine for Each Direction

Although a single state machine shared between both directions is sufficient and simplifies the design, it is possible to carry out the design with a separate state machine for each direction. The separate state machines have no practical value because a loopback can only be set up for one direction at a time. Also, a dual state machine is more complex and invites problems.

4.4 Loopback Network Location

The loopback network could possibly be placed ahead of the transformers instead of behind them. However, simplex power is derived at the transformers, and putting the Loopback Network ahead of the transformers would require additional circuitry to strip off power.

4.5 Application

Much of the logic and principles of the Repeater are directly applicable to other areas of application in T1 lines and other digital transmission such as T1 Customer Service Units (CSUs), Network Interfaces (NIs), and office repeaters. The SMART Repeater is merely the first embodiment of these principles.

4.6 Repeater Instruction Set

There are an infinite number of ways to define the Repeater Instruction Set. 9 bits is the best length for the basic word. Shorter lengths are unsatisfactory because they are more easily accidentally replicated by everyday transmission on the line. 8-bit words are an especially poor choice, because the bulk of live traffic is arranged in 8-bit words which would most easily accidentally duplicate an 8-bit loopback code. Word lengths longer than 9-bits are less appropriate because they are more easily corrupted by high error rates on the line, are more difficult for test equipment to transmit, and require more identification logic at the repeater.

4.7 Addressable Repeaters

One of the merits of this invention is that it doesn't require the repeater installer to set an address on the repeater itself. Rather, all repeaters are identical and the remote test unit merely steps sequentially from the first repeater to the last one. Alternative repeater fault location loop-back systems could be devised that give each repeater its own unique address. The perceived benefit of this approach is that the fault location system would be less susceptible to errors caused by a repeater with faulty logic that doesn't respond to loopback commands. Giving each repeater a unique address could be accomplished by having the repeater installer set address switches on the repeater itself at repeater installation, or it could be done electronically by the test system after the repeater is installed. Each of these two alternative methods has important drawbacks. Setting address switches on the repeater itself is awkward because the installer must be told what address to set. Mistakes could be made setting these addresses so that the system integrity is undermined. Likewise, the telephone company must set up a burdensome administrative system that tracks the addresses given to each repeater. The other possible method of giving individual addresses to each repeater is to do it electronically after installation. The problem with this approach is that the same complex administrative system must be set up, and there is no on-site verification that the remote electronic addressing process worked properly.

4.8 Timeouts

The choice made in choosing timeout times is felt to be the best one. There is some flexibility in choosing the exact values, but the rationale behind each choice is as follows. Each timeout should occur as early as possible to help protect the repeaters from false loopbacks caused by the normal T1 signal transmission. Because it takes the recognition of at least two commands before transmission is disrupted, it is advantageous to return the repeater to the Loopdown state as soon as possible after the first command is recognized. However, the timeout must not come so fast that the remote test unit, or, possibly, the technician controlling the repeater from a manual T1 pattern generator, cannot send the following instruction before the timeout occurs after the previous instruction. Although a remote test unit with the Automatic Test Procedures should be able to step through the instructions very quickly, a person with only a manual pattern generator would take a good deal more time to compose the Repeater Instructions. Therefore, rather than use a timeout of 5 or 10 seconds based on the remote test unit speed, a timeout of 60 seconds is used to allow manual control of the repeaters. Once the repeater is successfully looped up a timeout is also desirable. As shown in FIG. 14, two repeaters could possibly become cut off from the instructions from either direction of the T1 line. In this case it is vital that the repeater unloop itself, or a technician will have to be dispatched to repower the span to reset all the repeaters. The T1 loopback should reset itself within a matter of minutes, or its usefulness will be lessened because a dispatch would be preferable to waiting for the repeater to take the extra time to unloop itself. However, the repeater shouldn't unloop itself before the tester would be ready to finish. Common T1 tests last 15 minutes or less, so a twenty minute timeout is felt to be long enough to satisfy the tester in most cases while being short enough to be useful in restoring service promptly after an uncontrolled loopback.

4.9 Three-State Method

One alternative to the Four-State Loopback method we have developed is a three state method. In this method, there is no Test Initialization state. Rather, all repeaters on the T1 line proceed directly to the Loopback Pending state without cutting off the input signal from the output signal. Then, all the repeater loop up simultaneously. Then, the test unit loops down one repeater at a time as it sectionalizes the T1 line. This embodiment is not as well protected against accidental loopback. Where many loopbacks are installed, it could result in needless time spent unlooping repeaters after the problem had been found. Finally, this method increases the difficulty of recognizing when a loopback has successfully occurred.

4.10 Other Signalling Formats

There are many possible ways to signal the repeater on the line. For instance, a single code could be used for varying amounts of time to put the repeater into each of the four states. However, using a single code would require much more time and would be less efficient overall. Likewise, BPVs could be sent out in patterns to signal the repeater. This would have the disadvantage of being difficult to implement for the test unit and possibly being incompatible with network transmission equipment. The T1 line could be powered on and off at some rate that would signal each of the states. This method would be disadvantageous in that it could stress the line components and put restrictions on where the test equipment could be located. Also, four separate codes could be used instead of three separate codes. The use of 3 codes is better because it eliminates any delay that would otherwise occur between the 2nd and 3rd state (Loopback Pending and Loopup states).

4.11 Two-State Method

As a point of reference, the existing T1 loopback technology method uses a two-state method. The two states are loopup and loopdown. The limitation of two states means that only one loopback can be operated on the T1 line unless a direct addressing scheme is adopted.

4.12 RC Timing Circuits

It is possible to take the function of the RC Timing Circuits and put them on the Controller Custom Integrated Circuit itself. The method shown is superior because it simplifies product design. However, it may be desirable to integrate the function on the controller by adding counters.

4.13 Alternative 3-State Method

An alternative 3-state method to the one described in 4.9 is as follows. The Loopback Pending state is replaced with the test initialization state. The test unit send out signals in this sequence: test initialization, loopup, loopdown, loopup, loopdown, loopup, loopdown, and so on until the last repeater is looped down. Because there is no Loopback Pending state, all repeaters in the test initialization state will react to the loopup signal by looping up. Each repeater that is looped up will send test initialization signal down the line to following repeaters to return them to the test initialization state. The problem with this method is twofold. It won't work well with highspeed health checks, because a long string of repeaters would take too long to stabilize into the proper states after a loopup command. It would take at least one second per repeater to have all the repeaters automatically cycle from the Loopup state to the test initialization state. The other problem is that there would be some uncertainty as to whether all repeaters would actually loopup simultaneously.

4.14 Alternative 4-State Methods

Several variations are possible on the 4-state loopback method that we have invented. For instance, when a repeater is in the Loopback Pending and Loopup states, it is possible to not send test initialization code to the next repeater. Instead, a simple keep alive signal of any pattern could be sent. This implementation would have the disadvantage that the state of the following repeater would not be as tightly controlled—it would start in the Loopback Pending state, possibly timeout to the test initialization state, and possibly timeout to the Loopdown state. If the timeouts were lengthened or eliminated, then an important safeguard would be weakened or eliminated. Yet another possibility for a repeater in the Loopback Pending state and Loopup state is to send no signal at all to the following repeater. This also has the undesirable effect of loosening control over the states of the following repeaters. A third way of implementing the 4-state loopback is to rely on a long period of time before a repeater can be looped back again. That way an entire line of repeaters can be looped back iteratively. The four states are 1. Loopback Pending, 2. Loopup Complete, 3. Loopdown with Loopup recognition inhibited, 4. Loopdown. The repeater automatically times out in moving from state 3 to state 4. The disadvantage is that it breaks the circuit after only one command so that the line is more prone to false loopbacks. Another disadvantage is that the repeater can't be looped back again until the very long timeout period has passed.

4.15 Near and Far Loopback Method

One alternative to the bidirectional loopback is the Near and Far Loopback method. The Near and Far Loopback method features two separate loopbacks on the repeater, both towards the same direction, one before the regeneration circuitry and one after the regeneration tester to differentiate between failures on the transmission link and failures within the repeater circuitry. We found this approach less desirable because: (a) faults that this method would indicate as being on the transmission link could actually be on the repeater or within the repeater housing, (b) this method precludes the use of or is unattractive compared to the desirable bidirectional feature.

A repeater for the Near and Far Loopback method is shown in FIG. 17. In this alternative embodiment, bidirectional link $L_i$ is coupled to bidirectional link $L_{i+1}$. Bidirectional link $L_i$ includes an output channel 1600 which is coupled through relay pair 1601. Relay pair is normally open to connect line 1600 to line 1602, which is the input of a repeater circuit 1603. The output of repeater circuit 1603 is coupled to line 1604. Line 1604 is input to relay pair 1605. Relay pair 1605 is normally open to supply the signal from line 1604 to the input channel 1606 of bidirectional line $L_{i+1}$.

Likewise, the output channel 1607 of bidirectional link $L_{i+1}$ is coupled to relay pair 1608. Relay pair 1608 is normally open to connect the signal on line 1607 to the input on line 1609 of repeater 1610. The output of repeater 1610 on line 1611 is coupled to relay pair 1612, which is normally open to connect the signal on line 1611 to the input channel 1613 of the bidirectional link $L_i$.

A near loopback path is coupled between relay pair 1601 and relay pair 1612. This near loopback path, when open, connects a signal on line 1600 to the input on line 1614 to repeater circuit 1615. The output of repeater circuit 1615 is coupled on line 1616 to relay pair 1612. When switched, therefore, the signal on the output channel 1600 of bidirectional link $L_i$ is looped back for transmission on the input channel 1613 of bidirectional link $L_j$.

The far loopback path is coupled between relay pairs 1605 and 1608. The far loopback path, when open, connects a signal on line 1604 to the input on line 1617 of attenuator 1618. The output of attenuator 1618 is supplied on line 1619 to the input of relay pair 1608. When switched for far loopback, a signal on line 1619 is coupled to the input 1609 of repeater 1610.

When connected for far loopback, the signal on output channel 1600 of link $L_i$ is coupled through repeater 1603, attenuator 1618, and repeater 1609, for transmission back on the input channel 1613 of bidirectional link $L_j$.

14.16 Directional Loopback Method

Another alternative repeater architecture is shown in FIG. 17. In this embodiment, a directional repeater in the normal transmission line can be looped back without impact on the repeater for the opposite direction. As can be seen, the repeater architecture shown in FIG. 17 couples bidirectional link $L_i$ to bidirectional link $L_{i+1}$. The bidirectional link $L_i$ includes an output channel 1700 which is coupled to the input on line 1701 of repeater 1702. The output of repeater 1702 is coupled on line 1703 to the input of the switching matrix 1704. The output of switching matrix 1704 is connected on line 1705 in the normal condition to the input channel 1706 of bidirectional link $L_{i+1}$. Likewise, the output channel 1707 of bidirectional link $L_{i+1}$ is coupled to the input on line 1708 of repeater 1709. The output of repeater 1709 is connected on line 1710 as an input to switching matrix 1704. The output of switching matrix 1704 in its normal condition connects the signal on line 1710 across line 1711 to the input channel 1712 of bidirectional link $L_i$.

The switching matrix 1704 can be switched to connect the signal on line 1703 at the output of repeater 1702 to line 1711 and out on the input channel of bidirectional link $L_i$. Likewise, the switching matrix 1704 can be switched to connect the signal on line 1710 at the output of repeater 1709 to line 1705 for transmission on the input channel 1706 of bidirectional link $L_{i+1}$.

This embodiment has the disadvantage that both repeaters cannot be tested from a single test direction. However, increased granularity of testing is provided. It further eliminates the need for the attenuation circuitry which can be a source of false error data and the need for the testing repeater 1715 of the near and far embodiment shown in FIG. 16.

5.0 Conclusion

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

---

APPENDIX 1
Copyright WILTRON 1988

Smart Repeater Loopback Control Command Protocol
FAST REPEATER TEST COMMAND:
ADM-RPTR-T1 : [a] : b : c : d , e , f ;
a: CLLI CODE
b: repeater number, NULL = ALL.
c CTAG.
d: Action.
  U : loop up repeater number specified in b.
  D : loop down all repeaters. (return to transmit state)
  C : health check of the repeaters. Maximum number of repeater is specified in b. Health check will step through all repeaters and perform loop back access check. After health check, all repeaters are left in transmit mode.
  S : stress test the repeaters. Maximum number of repeater is specified in b. Stress test will step through all repeaters. Test sequence as follows: reset - loop up - send pattern-measure 1 sec - loop down - loop up - . . . Stress test pattern will be sent out and measured for one second period. After stress test, all repeaters are left in transmit mode.
e: frame type. U : unframed.
    S : super-framed.
    E : extended-superframe
f: stress test pattern used. QRS, xxxxxxxxxxxxxxxx 3 to 16 bits, null = 11000000 00000000
REPLY:
General reply header:
cr lf lf
  SID YY-MM-DD HHY:MM:SS cr lf
M    CTAG COMPLD cr lf
[g];
g : additional information
Action = U or C
  g = last successful repeater number
Action = S
  g = h i; where  h = repeater number. report for each repeater
                i = total error count maximum 32000, -OC indicates count overflow
Action = D
  g = loopdown successful (unsuccessful)

---

We claim:

1. An apparatus for transmitting data from a first terminal to a second terminal, comprising:

a plurality of bidirectional transmission links $L_i$, for i equal to 1 through N, across which data may be transmitted, each transmission $L_i$ having a first end and a second end, and the plurality including a first transmission link $L_1$;

test control means, connected at the first terminal to the first end of the first transmission link $L_1$, for communicating control signals in-band across the first transmission link $L_1$;

a plurality of repeaters $R_i$, for i equal to 1 through $N-1$, each of the repeaters connected to the second end of one transmission link $L_i$ in the plurality and the first end of an other transmission link $L_{i+1}$ in the plurality, and including:

first means for repeating data transmitted from the one transmission link $L_i$ for transmission on the other transmission link $L_{i+1}$, second means for repeating data transmitted from the other transmission link $L_{i+1}$ for transmission on the one transmission link $L_i$; and means, responsive to the control signals on the one transmission link $L_i$, for looping back data transmitted from the one transmission link $L_i$ for transmission on the one transmission link $L_i$.

2. The apparatus of claim 1, wherein each repeater $R_i$ further includes:

repeater control means, connected to the one transmission link $L_i$, the first means, the second means, and the means for looping back, and responsive to prespecified control signals on the one transmission link $L_i$, for detecting the prespecified control signals and setting a first state, a second state, a third state, and a fourth state, wherein, the first state is entered in response to detection of a first prespecified control signal during the fourth state, the second state is entered in response to detection of a second prespecified control signal during the first state, the third state is entered in response to detection of the second prespecified control signal during the second state, and the fourth state is entered in response to detection of a third specified control signal during the third state; and wherein the first means and second means operate during the first state and the fourth state, and the means for looping back operates during the third state.

3. The apparatus of claim 2, wherein each repeater $R_i$ further includes:

means, connected to the repeater control means, for generating and supplying the first prespecified control signal for transmission on the other transmission link $L_{i+1}$ during the second state and the third state; and wherein in addition, the first state is entered in response to the detection of the first prespecified control signal during the second state.

4. The apparatus of claim 1, wherein the test control means includes:

an interface by which user commands are supplied; and means, responsive to user commands, for generating a sequence of prespecified control signals to enable then disable the means for looping back in a determinate repeater $R_k$.

5. The apparatus of claim 4, wherein the test control means further includes:

means, responsive to user commands, for generating a sequence of test signals for supply to the determinate repeater $R_k$ while the means for looping back is enabled.

6. The apparatus of claim 4, wherein the test control means further includes:

means, responsive to a condition of signals looped back from the determinate repeater $R_k$, for indicating a fault condition in the determinate repeater $R_k$.

7. The apparatus of claim 5, wherein the test control means further includes:

means, responsive to a condition of test signals looped back from the determinate repeater $R_k$, for indicating a fault condition in the determinate repeater $R_k$.

8. The apparatus of claim 2, wherein the first prespecified control signal is a first multibit code, the second prespecified control signal is a second multibit code, and the third prespecified control signal is a third multibit code.

9. The apparatus of claim 8, wherein the first multibit code is 010100100, the second multibit code is 001101110, and the third multibit code is 110001110.

10. The apparatus of claim 1, wherein each repeater $R_i$ further includes:

a housing encasing the first means, the second means, and the means for looping back, the housing being no larger than 2.5 inches by 0.7 inches by 5.9 inches; and a connector, coupled to the housing, for connecting the one transmission link $L_i$ and the other transmission link $L_{i+1}$ to the repeater $R_i$.

11. The apparatus of claim 3, wherein each repeater $R_i$ further includes:

a housing encasing the first means, the second means, the means for looping back, and the means for generating and supplying, the housing being no larger than 2.5 inches by 0.7 inches by 5.9 inches; and a connector, coupled to the housing, for connecting the one transmission link $L_i$ and the other transmission link $L_{i+1}$ to the repeater $R_i$.

12. The apparatus of claim 1, wherein:

each repeater $R_i$ includes means, responsive to prespecified control signals on the one transmission link $L_i$, for generating and supplying a first prespecified control signal for transmission on the other transmission link $L_{i+1}$; and the test control means includes, an interface for receiving user commands, and means, responsive to a user command, for generating the first, a second and a third prespecified control signals to enable then disable the means for looping back and to enable then disable the means for generating and supplying in a determinate repeater $R_k$, where k is an integer between 1 and $N-1$.

13. The apparatus of claim 12, wherein:

for determinate repeater $R_k$, the first, second and third prespecified control signals are generated in an initial sequence including the first prespecified control signal, the second prespecified control signal, the second prespecified control signal, and the third prespecified control signal, followed by an iterative sequence repeated $k-1$ times if k is greater than 1, the iterative sequence including the second prespecified control signal, the second prespecified control signal, and the third prespecified control signal; and wherein the means for looping back is enabled in response to the second prespecified control signal and disabled in response to the third prespecified control signal; and the means for generating and supplying the first prespecified control signal is enabled in response to the second prespecified control signal and disabled in response to the first prespecified control signal or the third prespecified control signal.

14. The apparatus of claim 1, wherein the test control means includes:

means for communicating with a remote test center according to a prespecified protocol;

means, responsive to the prespecified protocol, for generating a sequence of prespecified control signals to enable then disable the means for looping back in a determinate repeater $R_k$; and means, responsive to signals looped back from the determinate repeater $R_k$, for reporting to the test center, according to the prespecified protocol, a fault condition on the determinate repeater $R_k$.

15. The apparatus of claim 1, wherein:

each repeater $R_i$ includes means, response to prespecified control signals on the one transmission link $L_i$, for generating and supplying a first prespecified control signal for transmission on the other transmission link $L_{i+1}$; and the test control means includes, means for communicating with a remote test center according to a prespecified protocol, means, responsive to the prespecified protocol, for generating the first, a second and a third prespecified control signals to enable then disable the means for looping back and to enable then disable the means for generating and supplying in a determinate repeater $R_k$, and means, responsive to a signal looped back from the determinate repeater $R_k$, for reporting to the test center, according to the prespecified protocol, a fault condition on the determinate repeater $R_k$.

16. The apparatus of claim 15, wherein:

for determinate repeater $R_k$, the first, second and third prespecified control signals are generated in an initial sequence including the first prespecified control signal, the second prespecified control signal, the second prespecified control signal, and the third prespecified control signal, followed by an iterative sequence repeated $k-1$ times if k is greater than 1, the iterative sequence including the second prespecified control signal, the second prespecified control signal, and the third prespecified control signal; and wherein the means for looping back is enabled in response to the second prespecified control signal and disabled in response to the third prespecified control signal; and the means for generating and supplying the first prespecified control signal is enabled in response to the second prespecified control signal is disabled in response to the first prespecified control signal or the third prespecified control signal.

17. The apparatus of claim 1, wherein:

the control signals include an address for a determinate repeater; and the determinate repeater includes means, responsive to the address, for enabling the means for looping back.

18. The apparatus of claim 1, further including:

second test control means, connected at the second terminal to the second end of transmission link $L_N$, for communicating control signals in-band across the transmission link $L_N$; and wherein each repeater further includes means, responsive to the control signals on the other transmission link $L_{i+1}$, for looping back data transmitted from the other transmission link $L_{i+1}$ for transmission on the other transmission link $L_{i+1}$.

19. An apparatus for transmitting data from a first terminal to a second terminal, comprising:

a plurality of bidirectional T1 transmission links $L_i$, for i equal to 1 through N, across which data may be transmitted, each transmission link $L_i$ having a first end and a second end, and the plurality including a first transmission link $L_1$; and test control means, connected at the first terminal to the first end of the first transmission link $L_1$, for communicating control signals in-band across the first transmission link $L_1$;

a plurality of repeaters $R_i$, for i equal to 1 through $N-1$, each of the repeaters connected to the second end of one transmission link $L_i$ in the plurality of the first end of an other transmission link $L_{i+1}$ in the plurality, each repeater including, first means for repeating data transmitted from the one transmission link $L_i$ for transmission on the other transmission link $L_{i+1}$, second means for repeating data transmitted from the other transmission link $L_{i+1}$ for transmission on the one transmission link $L_i$, and means, responsive to the control signals on the one transmission link $L_i$, for looping back data transmitted from the one transmission link $L_i$ for transmission on the one transmission link $L_i$.

20. The apparatus of claim 19, wherein each repeater $R_i$ further includes:

repeater control means, connected to the one transmission link $L_i$, the first means, the second means, and the means for looping back, and responsive to prespecified control signals on the one transmission link $L_i$, for detecting the prespecified control signals and setting a first state, a second state, a third state, and a fourth state, wherein the first state is entered in response to detection of a first prespecified control signal during the fourth state, the second state is entered in response to detection of a second prespecified control signal during the first state, the third state is entered in response to detection of the second prespecified control signal during the second state, and the fourth state is entered in response to detection of a third prespecified control signal during the third state; and wherein the first means and second operate during the first state and the fourth state, and the means for looping back operates during the third state.

21. The apparatus of claim 20, wherein each repeater $R_i$, further includes:

means, connected to the repeater control means, for generating and supplying the first prespecified control signal for transmission on the other transmission link $L_{i+1}$ during the second state and the third state; and wherein in addition, the first state is entered in response to the detection of the first prespecified control signal during the second state.

22. The apparatus of claim 19, wherein the test control means includes:

an interface by which user commands are supplied; and means, responsive to a user command, for generating a sequence of prespecified control signals to enable then disable the means for looping back in a determinate repeater $R_k$.

23. The apparatus of claim 22, wherein the test control means further includes:

means, responsive to the user command, for generating a sequence of test signals for supply to the determinate repeater $R_k$ while the means for looping back is enabled.

24. The apparatus of claim 22, wherein the test control means further includes:
means, responsive to a condition of signals looped back from the determinate repeater $R_k$, for indicating a fault condition in the determinate repeater $R_k$.

25. The apparatus of claim 23, wherein the test control means further includes:
means, responsive to a condition of test signals looped back from the determinate repeater $R_k$, for indicating a fault condition in the determinate repeater $R_k$.

26. The apparatus of claim 20, wherein the first prespecified control signal is a first multibit code, the second prespecified control signal is a second multibit code, and the third prespecified control signal is a third multibit code.

27. The apparatus of claim 26, wherein the first multibit code is 010100100, the second multibit code is 001101110, the third multibit code is 110001110.

28. The apparatus of claim 19, wherein each repeater $R_i$ further includes:
a housing encasing the first means, the second means, and the means for looping back, the housing being no larger than 2.5 inches by 0.7 inches by 5.9 inches; and
a connector, coupled to the housing, for connecting the one transmission link $L_i$ and the other transmission link $L_{i+1}$ to the repeater $R_i$.

29. The apparatus of claim 21, wherein each repeater $R_i$ further includes:
a housing encasing the first means, the second means, the means for looping back, and the means for generating and supplying, the housing being no larger than 2.5 inches by 0.7 inches by 5.9 inches; and
a connector, coupled to the housing, for connecting the one transmission link $L_i$ and the other transmission link $L_{i+1}$ to the repeater $R_i$.

30. The apparatus of claim 19, wherein:
each repeater $R_i$ includes means, responsive to prespecified control signals of the one transmission link $L_i$, for generating and supplying a first prespecified control signal for transmission on the other transmission link $L_{i+1}$; and
the test control means includes,
an interface for receiving user commands, and
means, responsive to a user command, for generating the first, a second and a third prespecified control signals to enable then disable the means for looping back and to enable then disable the means for generating and supplying in a determinate repeater $R_k$, where k is an integer between 1 and N−1.

31. The apparatus of claim 30, wherein:
for a determinate repeater $R_k$, the first, second and third prespecified control signals are generated in an initial sequence including the first prespecified control signal, the second prespecified control signal, the second prespecified control signal, and the third prespecified control signal, followed by an iterative sequence repeated k−1 times if k is greater than 1,
the iterative sequence including the second prespecified control signal, the second prespecified control signal, and the third prespecified control signal; and wherein
the means for looping back is enabled in response to the second prespecified control signal and disabled in response to the third prespecified control signal; and
the means for generating and supplying the first prespecified control signal is enabled in response to the second prespecified control signal and disabled in response to the first prespecified control signal or the third prespecified control signal.

32. The apparatus of claim 19, wherein the test control means includes:
means for communicating with a remote test center according to a prespecified protocol;
means, responsive to the prespecified protocol, for generating a sequence of prespecified control signals to enable then disable the means for looping back in a determinate repeater $R_k$; and
means, responsive to signals looped back from the determinate repeater $R_k$, for reporting according to the prespecified protocol a fault condition on the determinate repeater $R_k$ to the test center.

33. The apparatus of claim 19, wherein:
each repeater $R_i$ includes means, responsive to prespecified control signals on the one transmission link $L_i$, for generating and supplying a first prespecified control signal for transmission on the other transmission link $L_{i+1}$; and
the test control means includes,
means for communicating with a remote test center according to a prespecified protocol,
means, responsive to the prespecified protocol, for generating the first, a second and a third prespecified control signals to enable then disable the means for looping back and to enable then disable the means for generating and supplying in a determinate repeater $R_k$, and
means, responsive to signal looped back from the determinate repeater $R_k$, for reporting to the test center, according to the prespecified protocol, a fault condition on the determinate repeater $R_k$.

34. The apparatus of claim 33, wherein:
for the determinate repeater $R_k$, the first, second and third prespecified control signals are generated in an initial sequence including the first prespecified control signal, the second prespecified control signal, the second prespecified control signal, and the third prespecified control signal, followed by an iterative sequence repeated k−1 times if k is greater than 1,
the iterative sequence including the second prespecified control signal, the second prespecified control signal, and the third prespecified control signal; and wherein
the means for looping back is enabled in response to the second prespecified control signal and disabled in response to the third prespecified control signal; and
the means for generating and supplying the first prespecified control signal is enabled in response to the second prespecified control signal and disabled in response to the first prespecified control signal or the third prespecified control signal.

35. The apparatus of claim 19, wherein:
the control signals include an address for a determinate repeater; and
a determinate repeater includes means, responsive to the address, for enabling the means for looping back.

36. The apparatus of claim 19, further including:

second test control means, connected at the second terminal to the second end of transmission link $L_N$, for communicating control signals across the transmission link $L_N$; and wherein each repeater further includes means, responsive to the control signals on the other transmission link $L_{i+1}$, for looping back data transmitted from the other transmission link $L_{i+1}$ for transmission on the other transmission link $L_{i+1}$.

37. An apparatus coupling a first bidirectional transmission link to a second bidirectional transmission link, comprising:

first means for repeating signals transmitted from the first bidirectional transmission link for transmission on the second bidirectional transmission link;

second means for repeating signals transmitted from the second bidirectional transmission link for transmission on the first bidirectional transmission link; and means, responsive to prespecified control signals inband on the first bidirectional transmission link, for looping back signals transmitted from the first bidirectional transmission link for transmission on the first bidirectional transmission link.

38. The apparatus of claim 37, further including:

means, responsive to prespecified control signals on the second bidirectional transmission link, for looping back signals transmitted from the second bidirectional transmission link for transmission on the second bidirectional transmission link.

39. The apparatus of claim 37, wherein the prespecified control signals include an address identifYing the apparatus.

40. The apparatus of claim 37, wherein the means for looping back signals on the first bidirectional link includes:

first loop means, connected to the first means and the second means, for supplying signals repeated for transmission by the first means to the second means so that the second means repeats the signals for transmission on the first bidirectional link.

41. The apparatus of claim 40, wherein the first loop means includes means, connected between the first means and the second means, for attenuating the signals repeated by the first means.

42. The apparatus of claim 38, wherein:

the means for looping back signals on the first bidirectional link includes first loop means, connected to the first means and the second means, for supplying signals repeated for transmission by the first means to the second means so that the second means repeats the signals for transmission on the first bidirectional link; and wherein the means for looping back signals on the second bidirectional link includes second loop means, connected to the second means and the first means, for supplying signals repeated for transmission by the second means to the first means so that the first means repeats the signals for transmission on the second bidirectional link.

43. The apparatus of claim 42, wherein:

the first loop means includes means, connected between the first means and the second means, for attenuating the signals repeated by the first means; and wherein the second loop means includes means, connected between the second means and the first means, for attenuating the signals repeated by the second means.

44. The apparatus of claim 37, further including:

repeater control means, connected to the first means and the means for looping back, for generating switching signals in response to prespecified control signals from the first bidirectional link; and wherein the means for looping back includes means, responsive to the switching signals, for connecting the signals on the first bidirectional link for transmission back on the first bidirectional link.

45. The apparatus of claim 44, wherein the repeater control means comprises a state machine.

46. The apparatus of claim 45, wherein the repeater control means includes an internal clock.

47. The apparatus of claim 45, wherein the state machine has more than two states.

48. The apparatus of claim 38, further including:

repeater control means, connected to the first means, second means, the means for looping back signals on the first bidirectional link, and the means for looping back signals on the second bidirectional link, for generating switching signals in response to prespecified control signals from the first bidirectional link or the second bidirectional link; and wherein the means for looping back signals on the first bidirectional link includes means, responsive to the switching signals, for connecting the signals on the first bidirectional link for transmission back on the first bidirectional link; and wherein the means for looping back signals on the second bidirectional link includes means, responsive to the switching signals, for connecting the signals on the second bidirectional link for transmission back on the second bidirectional link.

49. The apparatus of claim 48, wherein the repeater control means comprises a first state machine connected to the means for looping back signals on the first bidirectional link, and a second state machine connected to the means for looping back signals on the second bidirectional link.

50. The apparatus of claim 48, wherein the repeater control means comprises a state machine connected to the means for looping back signals on the first bidirectional link and to the means for looping back signals on the second bidirectional link.

51. The apparatus of claim 50, wherein the repeater control means includes an internal clock.

52. The apparatus of claim 50, wherein the state machine has more than two states.

53. The apparatus of claim 49, wherein the repeater control means includes an internal clock.

54. The apparatus of claim 49, wherein the first state machine has more than two states, and the second state machine has more than two states.

55. The apparatus of claim 37, wherein the prespecified control signals include a first multibit code, a second multibit code, and a third multibit code.

56. The apparatus of claim 55, wherein the first multibit code is 010100100, the second multibit code is 001101110, and the third multibit code is 110001110.

57. An apparatus coupling a first bidirectional T1 transmission link to a second bidirectional T1 transmission link, comprising:

first means for repeating signals transmitted from the first bidirectional T1 transmission link for transmission on the second bidirectional T1 transmission link;

second means for repeating signals transmitted from the second bidirectional T1 transmission link for transmission on the first bidirectional T1 transmission link; and means, responsive to prespecified in-band control signals on the first bidirectional T1 transmission link, for looping back signals transmitted from the irst bidirectional T1 transmission link for transmission on the first bidirectional T1 transmission link.

58. The apparatus of claim 57, further including:

means, responsive to prespecified control signals on the second bidirectional T1 transmission link, for looping back signals transmitted from the second bidirectional T1 transmission link for transmission on the second bidirectional T1 transmission link.

59. The apparatus of claim 57, wherein the prespecified control signals include an address identifying the apparatus.

60. The apparatus of claim 57, wherein the means for looping back signals on the first bidirectional T1 transmission link includes:

first loop means, connected to the first means and the second means, for supplying signals repeated for transmission by the first means to the second means so that the second means repeats the signals for transmission on the first bidirectional T1 transmission link.

61. The apparatus of claim 60, wherein the first loop means includes means, connected between the first means and the second means, for attenuating the signals repeated by the first means.

62. The apparatus of claim 58, wherein:

the means for looping back signals on the first bidirectional T1 transmission link includes, first loop means, connected to the first means and the second means, for supplying signals repeated for transmission by the first means to the second means so that the second means repeats the signals for transmission on the first bidirectional T1 transmission link; and wherein the means for looping back signals on the second bidirectional T1 transmission link includes, second loop means, connected to the second means and the first means, for supplying signals repeated for transmission by the second means to the first means so that the first means repeats the signals for transmission on the second bidirectional T1 transmission link.

63. The apparatus of claim 62, wherein the first loop means includes means, connected between the first means and the second means, for attenuating the signals repeated by the first means; and wherein the second loop means includes means, connected between the second means and the first means, for attenuating the signals repeated by the second means.

64. The apparatus of claim 57, further including: repeater control means, connected to the first means and the means for looping back, for generating switching signals in response to prespecified control signals from the first bidirectional T1 transmission link; and wherein the means for looping back includes means, responsive to the switching signals, for connecting the signals on the first bidirectional T1 transmission for transmission back on the first bidirectional T1 transmission link.

65. The apparatus of claim 64, wherein the repeater control means comprises a state machine.

66. The apparatus of claim 65, wherein the state machine includes a internal clock.

67. The apparatus of claim 57, wherein the prespecified control signals include a first multibit code, a second multibit code, and a third multibit code.

68. The apparatus of claim 67, wherein the first multibit code is 010100100, the second multibit code is 001101110, and the third multibit code is 110001110.

69. An apparatus coupling a first bidirectional transmission link having an input channel and an output channel, to a second bidirectional transmission link having an input channel and an output channel, comprising:

first means, having a first repeater input and a first repeater output, for repeating signals supplied to the first repeater input for supplying to the first repeater output;

second means, having a second repeater input and a second repeater output, for repeating signals supplied to the second repeater input for supply to the second repeater output;

first loop means, having a first loop input and a first loop output, for supplying signals supplied to the first loop input to the first loop output;

repeater control means, connected to the first repeater output, and responsive to prespecified control signals, for detecting the prespecified control signals and generating switch control signals;

first switching means, connected to the repeater control means and responsive to the switch control signals, for connecting, when indicated by the switch control signals, the output channel of the first bidirectional transmission link to the first repeater input and the first repeater output to the input channel of the second bidirectional transmission link, and the output channel of the second bidirectional transmission link to the second repeater input and the second repeater output to the input channel of the first bidirectional transmission link; and second switching means, connected to the repeater control means and responsive to the switch control signals, for connecting, when indicated by the switch control signals, the output channel of the first bidirectional transmission link to the first repeater input and the first repeater output to the first loop input, and the first loop output to the second repeater input and the second repeater output to the input channel of the first bidirectional transmission link.

70. The apparatus of claim 69, wherein the repeater control means is connected to the second repeater output and further including:

second loop means, having a second loop input and a second loop output, for supplying signals supplied to the second loop input to the second loop output; and third switching means, connected to the repeater control means and responsive to the switch control signals, for connecting, when indicated by the switch control signals, the output channel of the second bidirectional transmission link to the second repeater input and the second repeater output to the second loop input, and the second loop output to the first repeater input and the first repeater output to the input channel of the second bidirectional transmission link.

71. The apparatus of claim 70, wherein the repeater control means includes means for resolving contention between prespecified control signals received across the first bidirectional transmission link and prespecified control signals received across the second bidirectional transmission link.

72. The apparatus of claim 69, wherein:
the switch control signals indicate a first state, a second state, a third state, and a fourth state, wherein,
  the first state is entered in response to detection of a first prespecified control signal during the fourth state,
  the second state is entered in response to detection of a second prespecified control signal during the first state,
  the third state is entered in response to detection of the second prespecified control signal during the second state, and
  the fourth state is entered in response to detection of a third prespecified control signal during the third state; and wherein
the first switching means operates during the first state and the fourth state; and
the second switching means operates during the third state.

73. The apparatus of claim 70, wherein:
the switch control signals indicate a first state, a second state, a third state, and a fourth state, wherein,
  the first state is entered in response to detection of a first prespecified control signal during the fourth state,
  the second state is entered in response to detection of a second prespecified control signal during the first state,
  the third state is entered in response to detection of the second prespecified control signal during the second state, and
  the fourth state is entered in response to detection of a third prespecified control signal during the third state; and wherein
the first switching means operates during the first state and the fourth state;
the second switching means operates during the third state if the prespecified control signals are received across the first bidirectional transmission link; and
the third switching means operates during the third state if the prespecified control signals are received across the second bidirectional transmission link.

74. The apparatus of claim 72, further including:
means, connected to the repeater control means, for generating and supplying the first prespecified control signal for transmission on the second bidirectional transmission link during the second state and the third state; and
wherein in addition, the first state is entered in response to the detection of the first prespecified control signal at the first repeater output during the second state.

75. The apparatus of claim 73, further including:
means, having a signal output and connected to the repeater control means, for generating and supplying the first prespecified control signal at the signal output during the second state and the third state; and
fourth switching means, connected to the repeater control means and responsive to the switch control signals, for connecting, when indicated by the switch control signals, the signal output to the input channel of the first bidirectional transmission link if the prespecified control signals are received across the second bidirectional link, or to the input channel of the second bidirectional transmission link if the prespecified control signals are received across the first bidirectional link; and
wherein in addition, the first state is entered in response to detection of the first prespecified control signal from the same bidirectional transmission link from which the second prespecified signal came during the second state.

76. The apparatus of claim 73, wherein the repeater control means includes means for resolving contention between prespecified control signals received across the first bidirectional transmission link and prespecified control signals received across the second bidirectional transmission link.

77. The apparatus of claim 72, wherein the repeater control means further includes:
timing means for setting the repeater control means to the fourth state from the first state, second state or third state upon expiration of a first time out, a second time out or a third time out, respectively.

78. The apparatus of claim 77, wherein the timing means includes an internal clock.

79. The apparatus of claim 73, wherein the repeater control means further includes:
timing means for setting the repeater control means to the fourth state from the first state, second state or third state upon expiration of a first time out, a second time out or a third time out, respectively.

80. The apparatus of claim 79, wherein the timing means includes an internal clock.

81. The apparatus of claim 69, wherein the repeater control means comprises a state machine.

82. The apparatus of claim 81, wherein the state machine includes an internal clock.

83. The apparatus of claim 70, wherein the repeater control means comprises a state machine.

84. The apparatus of claim 83, wherein the repeater control means includes an internal clock.

85. The apparatus of claim 69, wherein the first loop means includes:
means for attenuating signals supplied to the first loop input to generate attenuated signals and for supplying the attenuated signals to the first loop output.

86. The apparatus of claim 70, wherein the second loop means includes:
means for attenuating signals supplied to the second loop input to generate attenuated signals and for supplying the attenuated signals to the second loop output.

87. The apparatus of claim 69, wherein the prespecified control signals include a first multibit code, a second multibit code, and a third multibit code.

88. The apparatus of claim 87, wherein the first multibit code is 010100100, the second multibit code is 001101110, and the third multibit code is 110001110.

89. The apparatus of claim 69, wherein the prespecified control signals are in-band.

90. The apparatus of claim 69, wherein the first bidirectional transmission link and the second bidirectional transmission link are T1 links.

91. An apparatus coupling a first bidirectional transmission link having an input channel and an output channel, to a second bidirectional transmission link having an input channel and an output channel, comprising:
first means, having a first repeater input and a first repeater output, for repeating signals supplied to the first repeater input for supply to the first repeater output;
second means, having a second repeater input and a second repeater output, for repeating signals supplied to the second repeater input for supply to the second repeater output;
first loop means, having a first loop input and a first loop output, for supplying signals supplied to the first loop input to the first loop output;
second loop means, having a second loop input and a second loop output, for supplying signals supplied to the second loop input to the second loop output;
repeater control means, connected to the first repeater output and the second repeater output, and responsive to prespecified control signals on the first repeater output or the second repeater output, for detecting the prespecified control signals from a test duration and setting a first state, a second state, a third state, and a fourth state, including means for setting the test direction as the first bidirectional link if the first prespecified control signal is received first at the first repeater output, or the second bidirectional link if the first prespecified control signal is received first at the second repeater output, wherein,
the first state is entered in response to detection of the first prespecified control signal during the fourth state,
the second state is entered in response to detection of a second prespecified control signal during the first state,
the third state is entered in response to detection of the second prespecified control signal during the second state, and
the fourth state is entered in response to detection of a third prespecified control signal during the third state; and
switching means, connected to the repeater control means, for,
during the first state and the fourth state, connecting the output channel of the first bidirectional transmission link to the first repeater input and the first repeater output to the input channel of the second bidirectional transmission link, and the output channel of the second bidirectional transmission link to the second repeater input and the second repeater output to the input channel of the first bidirectional transmission link,
during the third state if the test direction is the first bidirectional link, connecting the output channel of the first bidirectional transmission link to the first repeater input and the first repeater output to the first loop input, and the first loop output to the second repeater input and the second repeater output to the input channel of the first bidirectional transmssion link, and
during the third state if the test direction is the second bidirectional link, connecting the output channel of the second bidirectional transmission link to the second repeater input and the second repeater output to the second loop input, and the second loop output to the first repeater input and the first repeater output to the input channel of the second bidirectional transmission link.

92. The apparatus of claim 91, further including:
means, connected to the repeater control means, and having a signal output, for supplying the first prespecified control signal to the signal output during the second state and the third state; and wherein
the switching means, during the second state and the third state if the test direction is the first bidirectional link, connects the signal output to the input channel of the second bidirectional transmission link, and during the second state and the third state if the test direction is the second bidirectional link, connects the signal output to the output channel of the first bidirectional link; and
wherein in addition, the first state is entered in response to the detection of the first prespecified control signal during the second state.

93. The apparatus of claim 92, wherein the repeater control means further includes:
timing means for setting the repeater control means to the fourth state from the first state, second state or third state upon expiration of a first time out, a second time out or a third time out, respectively.

94. The apparatus of claim 93, wherein the timing means includes an internal clock.

95. The apparatus of claim 91, wherein the first loop means includes:
means for attenuating signals supplied to the first loop input to generate attenuated signals and for supplying the attenuated signals to the first loop output.

96. The apparatus of claim 91, wherein the second loop means includes:
means for attenuating signals supplied to the second loop input to generate attenuated signals and for supplying the attenuated signals to the second loop output.

97. The apparatus of claim 91, wherein the prespecified control signals include a first multibit code, a second multibit code, and a third multibit code.

98. The apparatus of claim 97, wherein the first multibit code is 010100100, the second multibit code is 001101110, and the third multibit code is 110001110.

99. The apparatus of claim 91, wherein the prespecified control signals are in-band.

100. The apparatus of claim 91, wherein the first bidirectional transmission link and the second bidirectional transmission link are T1 links.

101. An apparatus for transmitting data from a first terminal to a second terminal, comprising:
a plurality of bidirectional transmission links $L_i$, for i equal to 1 through N, across which data may be transmitted, each transmission link $L_i$ having a first end and a second end, and the plurality of including a first transmission link $L_1$;
test control means, connected at the first terminal to the first end of the first transmission link $L_1$, for communicating control signals in-band across the first transmission link $L_1$;
a plurality of repeaters $R_i$, for i equal to 1 through N−1, each of the repeaters connected to the second end of one transmission link $L_i$ in the plurality and the first end of an other transmission link $L_{i+1}$ in the plurality, each repeater including,
first means for repeating data transmitted from the one transmission link $L_i$ for transmission on the other transmssion link $L_{i+1}$,
second means for repeating data transmitted from the other transmission link $L_{i+1}$ for transmission on the one transmission link $L_i$, and means, responsive to the control signals on the one transmission link $L_i$, for looping back data transmitted from the one transmission link $L_i$ for transmission on the one transmission link $L_i$; and wherein the test control means includes,
- an interface by which user commands are supplied,
- means, responsive to user commands, for generating a sequence of prespecified control signals to enable then disable the means for looping back in a determinate repeater $R_k$,
- means, responsive to user commands, for generating a sequence of test signals for supply to the determinate repeater $R_k$ while the means for looping back is enabled, and
- means, responsive to a condition of test signals looped back from the determinate repeater $R_k$, for indicating a fault condition in the determinate repeater $R_k$.

102. The apparatus of claim 101, wherein the user interface includes:
- means for communicating with a remote test center according to a prespecified protocol;
- means, responsive to the prespecified protocol, for generating the user commands; and
- means, responsive to a fault condition on the determinate repeater $R_k$, for reporting to the remote test center, according to the prespecified protocol, the fault condition on the determinate repeater $R_k$.

* * * * *